United States Patent
Hall et al.

(10) Patent No.: US 10,018,726 B2
(45) Date of Patent: Jul. 10, 2018

(54) INTEGRATED ILLUMINATION AND DETECTION FOR LIDAR BASED 3-D IMAGING

(71) Applicant: Velodyne Lidar, Inc., Morgan Hill, CA (US)

(72) Inventors: David S. Hall, Los Altos Hills, CA (US); Pieter J. Kerstens, Gilroy, CA (US); Mathew Noel Rekow, Santa Cruz, CA (US)

(73) Assignee: Velodyne Lidar, Inc., Morgan Hill, CA (US)

( * ) Notice: Subject to any disclaimer, the term of this patent is extended or adjusted under 35 U.S.C. 154(b) by 0 days.

(21) Appl. No.: 15/420,384

(22) Filed: Jan. 31, 2017

(65) Prior Publication Data
US 2017/0269215 A1 Sep. 21, 2017

Related U.S. Application Data

(60) Provisional application No. 62/310,670, filed on Mar. 19, 2016.

(51) Int. Cl.
*G01S 7/481* (2006.01)
*G01S 17/89* (2006.01)
(Continued)

(52) U.S. Cl.
CPC ............ *G01S 17/89* (2013.01); *G01S 7/4811* (2013.01); *G01S 17/10* (2013.01); *G01S 17/42* (2013.01)

(58) Field of Classification Search
CPC ........ G01S 17/42; G01S 17/10; G01S 7/4811; G01S 17/89
(Continued)

(56) References Cited

U.S. PATENT DOCUMENTS 3,373,441 A * 3/1968 Zadig .................. G01S 17/50
342/66
4,201,442 A * 5/1980 McMahon ............ G02F 1/1326
349/196
(Continued)

OTHER PUBLICATIONS

"Cassegrain reflector," Wikipedia 2014, downloaded Jun. 22, 2017 from https://en.wikipedia.org/w/index.php?title=Cassegrain_reflector&oldid=628931365, 6 pages.*
(Continued)

*Primary Examiner* — Daniel L Murphy
(74) *Attorney, Agent, or Firm* — Spano Law Group; Joseph S. Spano

(57) ABSTRACT

Methods and systems for performing three dimensional LIDAR measurements with a highly integrated LIDAR measurement device are described herein. In one aspect, the illumination source, detector, and illumination drive are integrated onto a single printed circuit board. In addition, in some embodiments, the associated control and signal conditioning electronics are also integrated onto the common printed circuit board. Furthermore, in some embodiments, the illumination drive and the illumination source are integrated onto a common Gallium Nitride substrate that is independently packaged and attached to the printed circuit board. In another aspect, the illumination light emitted from the illumination source and the return light directed toward the detector share a common optical path within the integrated LIDAR measurement device. In some embodiments, the return light is separated from the illumination light by a beam splitter. In some other embodiments, the optical design avoids losses associated with a beam splitter.

23 Claims, 17 Drawing Sheets

(51) Int. Cl.
*G01S 17/10* (2006.01)
*G01S 17/42* (2006.01)
*G01S 17/06* (2006.01)

(58) Field of Classification Search
USPC ........................................... 356/5.01
See application file for complete search history.

(56) References Cited

U.S. PATENT DOCUMENTS

| | | | |
|---|---|---|---|
| 4,516,837 A * | 5/1985 | Soref | G02F 1/31 |
| | | | 349/196 |
| 7,969,558 B2 | 6/2011 | Hall | |
| 8,675,181 B2 | 3/2014 | Hall | |
| 8,767,190 B2 | 7/2014 | Hall | |
| 9,069,080 B2 * | 6/2015 | Stettner | G01S 17/023 |
| 9,310,197 B2 * | 4/2016 | Gogolla | G01S 7/4812 |
| 2003/0057533 A1 * | 3/2003 | Lemmi | B41J 2/45 |
| | | | 257/678 |
| 2016/0313445 A1 * | 10/2016 | Bailey | G01S 7/481 |

OTHER PUBLICATIONS

"Aperture definition," Merriam-Webster, 2017, downloaded Jun. 22, 2017 from https://www.merriam-webster.com/dictionary/aperture, 12 pages.*

* cited by examiner ured. A distance is derived
INTEGRATED ILLUMINATION AND DETECTION FOR LIDAR BASED 3-D IMAGING

CROSS REFERENCE TO RELATED APPLICATION

The present application for patent claims priority under 35 U.S.C. § 119 from U.S. provisional patent application Ser. No. 62/310,670, entitled "Integrated Illumination and Detection for LIDAR Based 3-D Imaging," filed Mar. 19, 2016, the subject matter of which is incorporated herein by reference in its entirety.

TECHNICAL FIELD

The described embodiments relate to LIDAR based 3-D point cloud measuring systems.

BACKGROUND INFORMATION

LIDAR systems employ pulses of light to measure distance to an object based on the time of flight (TOF) of each pulse of light. A pulse of light emitted from a light source of a LIDAR system interacts with a distal object. A portion of the light reflects from the object and returns to a detector of the LIDAR system. Based on the time elapsed between emission of the pulse of light and detection of the returned pulse of light, a distance is estimated. In some examples, pulses of light are generated by a laser emitter. The light pulses are focused through a lens or lens assembly. The time it takes for a pulse of laser light to return to a detector mounted near the emitter is measured. A distance is derived from the time measurement with high accuracy.

Some LIDAR systems employ a single laser emitter/detector combination combined with a rotating mirror to effectively scan across a plane. Distance measurements performed by such a system are effectively two dimensional (i.e., planar), and the captured distance points are rendered as a 2-D (i.e. single plane) point cloud. In some examples, rotating mirrors are rotated at very fast speeds (e.g., thousands of revolutions per minute).

In many operational scenarios, a 3-D point cloud is required. A number of schemes have been employed to interrogate the surrounding environment in three dimensions. In some examples, a 2-D instrument is actuated up and down and/or back and forth, often on a gimbal. This is commonly known within the art as "winking" or "nodding" the sensor. Thus, a single beam LIDAR unit can be employed to capture an entire 3-D array of distance points, albeit one point at a time. In a related example, a prism is employed to "divide" the laser pulse into multiple layers, each having a slightly different vertical angle. This simulates the nodding effect described above, but without actuation of the sensor itself.

In all the above examples, the light path of a single laser emitter/detector combination is somehow altered to achieve a broader field of view than a single sensor. The number of pixels such devices can generate per unit time is inherently limited due limitations on the pulse repetition rate of a single laser. Any alteration of the beam path, whether it is by mirror, prism, or actuation of the device that achieves a larger coverage area comes at a cost of decreased point cloud density.

As noted above, 3-D point cloud systems exist in several configurations. However, in many applications it is necessary to see over a broad field of view. For example, in an autonomous vehicle application, the vertical field of view should extend down as close as possible to see the ground in front of the vehicle. In addition, the vertical field of view should extend above the horizon, in the event the car enters a dip in the road. In addition, it is necessary to have a minimum of delay between the actions happening in the real world and the imaging of those actions. In some examples, it is desirable to provide a complete image update at least five times per second. To address these requirements, a 3-D LIDAR system has been developed that includes an array of multiple laser emitters and detectors. This system is described in U.S. Pat. No. 7,969,558 issued on Jun. 28, 2011, the subject matter of which is incorporated herein by reference in its entirety.

In many applications, a sequence of pulses is emitted. The direction of each pulse is sequentially varied in rapid succession. In these examples, a distance measurement associated with each individual pulse can be considered a pixel, and a collection of pixels emitted and captured in rapid succession (i.e., "point cloud") can be rendered as an image or analyzed for other reasons (e.g., detecting obstacles). In some examples, viewing software is employed to render the resulting point clouds as images that appear three dimensional to a user. Different schemes can be used to depict the distance measurements as 3-D images that appear as if they were captured by a live action camera.

Some existing LIDAR systems employ an illumination source and a detector that are not integrated together onto a common substrate (e.g., electrical mounting board). Furthermore, the illumination beam path and the collection beam path are separated within the LIDAR device. This leads to opto-mechanical design complexity and alignment difficulty.

Improvements in the opto-mechanical design of LIDAR systems are desired, while maintaining high levels of imaging resolution and range.

SUMMARY

Methods and systems for performing three dimensional LIDAR measurements with a highly integrated LIDAR measurement device are described herein. In one aspect, the illumination source, detector, and illumination drive are integrated onto a single printed circuit board. In addition, in some embodiments, the associated control and signal conditioning electronics are also integrated onto the common printed circuit board. Furthermore, in some embodiments, the illumination drive and the illumination source are integrated onto a common Gallium Nitride substrate that is independently packaged and attached to the printed circuit board.

In some embodiments a 3-D LIDAR system includes multiple integrated LIDAR measurement devices. In some embodiments, a delay time is set between the firing of each integrated LIDAR measurement device. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

In another aspect, the illumination light emitted from the illumination source and the return light directed toward the detector share a common optical path within the integrated LIDAR measurement device. In some embodiments, the return light is separated from the illumination light by a beam splitter. In general, when the polarization of the return light is completely mixed and a single polarizing beam splitter is employed, half of the return light will be directed toward detector and the other half will be directed toward the illumination source. In some other embodiments, these losses are avoided by employing one or more polarization control elements to alter the polarization state of light passing through the polarization control element in coordination with the firing of the illumination source and the timing of the measurement time window to minimize losses of return light.

In some other embodiments, the return light is separated from the illumination light by optical design to avoid losses associated with a beam splitter.

In some embodiments, a detector includes a slot through the detector including the active sensing area. The illumination source is fixed to the back of the detector and is configured to emit illumination light through the slot in the detector. In this manner, both the detector and illumination source are located in the beam path of light emitted from an integrated LIDAR measurement device and returned to the integrated LIDAR measurement device. Although a certain amount of return light will be directed toward the slot and not detected, the relatively small area of the slot compared to the active area of the detector ensures that the majority of the return light is detected.

In some embodiments, the illumination source is located outside the field of view of the detector. In some embodiments, the index of refraction of an active optical element is controlled to pass return light and refract illumination light toward the common optical path shared by both the illumination light and the return light. The illumination light is not initially aligned with the optical axis of the optical system. However, during periods of time when light is emitted from the illumination source, the active optical element changes its state such that the illumination light is aligned with the optical axis of the optical system.

In some embodiments, a concentric focusing optic focuses return light onto the detector and a passive optical element located in the middle of the concentric focusing optic refracts the illumination light toward the common optical path shared by both the illumination light and the return light.

In some embodiments, the return light reflects from a mirror element and propagates toward the detector. In one aspect, the mirror includes a slot through which the illumination light is passed. This effectively injects the illumination light into the common optical path shared by by both the illumination light and the return light.

In some embodiments, the illumination source is located in the optical path of the return light in front of the detector.

In some other embodiments, the illumination source is embedded in an optical element that is located in the optical path of the return light in front of the detector.

In another aspect, illumination light is injected into the detector reception cone by a waveguide. An optical coupler optically couples and illumination source to the waveguide. At the end of the waveguide, a mirror element is oriented at a 45 degree angle with respect to the waveguide to inject the illumination light into the cone of return light. In some embodiments, the waveguide includes a rectangular shaped glass core and a polymer cladding of lower index of refraction. In some embodiments, the entire assembly is encapsulated with a material having an index of refraction that closely matches the index of refraction of the polymer cladding. In this manner, the waveguide injects the illumination light into the acceptance cone of return light with minimal occlusion.

In some embodiments, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Figure 1:
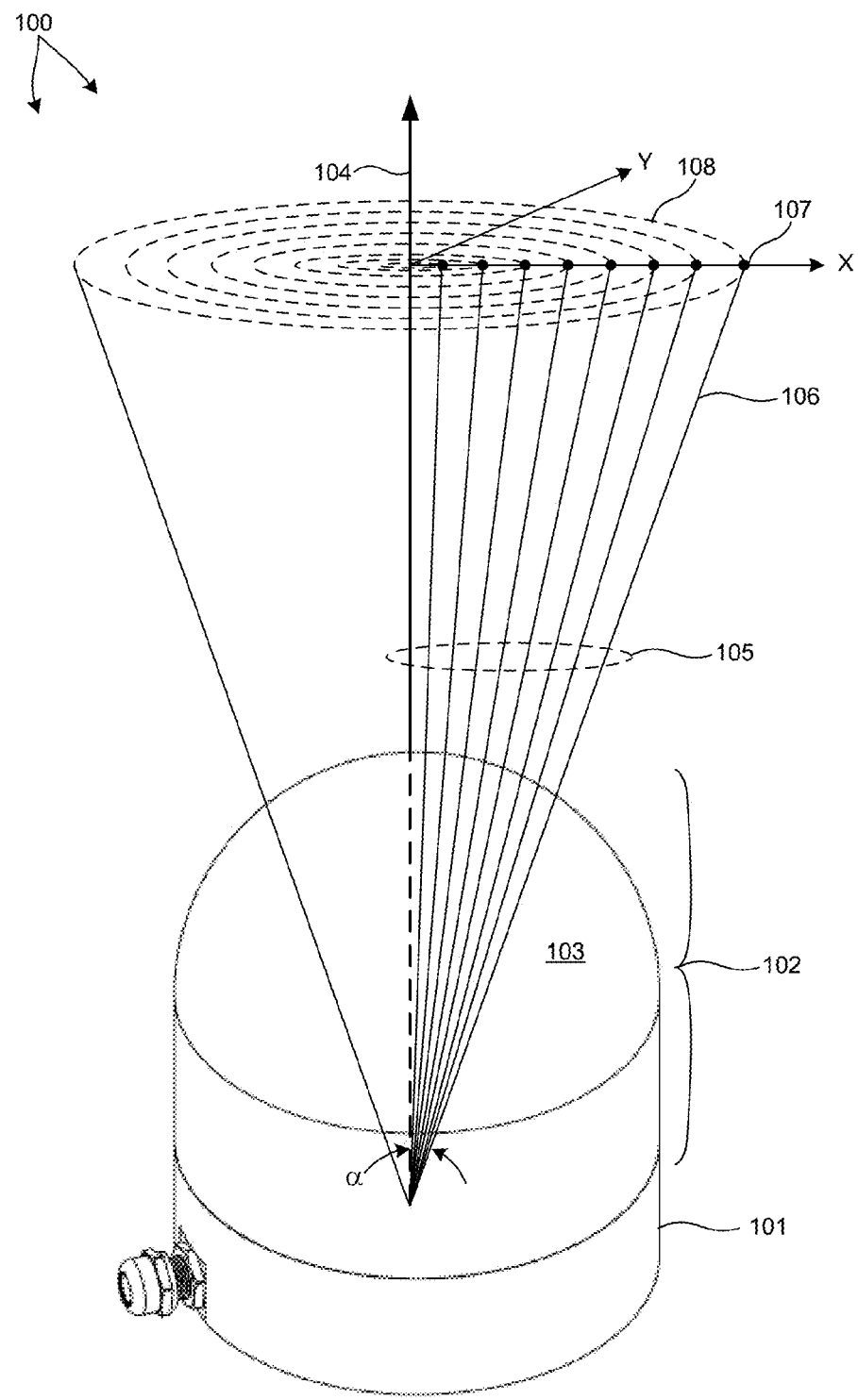
FIG. 1 is a simplified diagram illustrative of one embodiment of a 3-D LIDAR system 100 in at least one novel aspect.

FIG. 1 is a diagram illustrative of an embodiment of a 3-D LIDAR system 100 in one exemplary operational scenario. 3-D LIDAR system 100 includes a lower housing 101 and an upper housing 102 that includes a domed shell element 103 constructed from a material that is transparent to infrared light (e.g., light having a wavelength within the spectral range of 700 to 1,700 nanometers). In one example, domed shell element 103 is transparent to light having a wavelengths centered at 905 nanometers.

As depicted in FIG. 1, a plurality of beams of light 105 are emitted from 3-D LIDAR system 100 through domed shell element 103 over an angular range, a, measured from a central axis 104. In the embodiment depicted in FIG. 1, each beam of light is projected onto a plane defined by the x and y axes at a plurality of different locations spaced apart from one another. For example, beam 106 is projected onto the xy plane at location 107.

In the embodiment depicted in FIG. 1, 3-D LIDAR system 100 is configured to scan each of the plurality of beams of light 105 about central axis 104. Each beam of light projected onto the xy plane traces a circular pattern centered about the intersection point of the central axis 104 and the xy plane. For example, over time, beam 106 projected onto the xy plane traces out a circular trajectory 108 centered about central axis 104.

Figure 2:
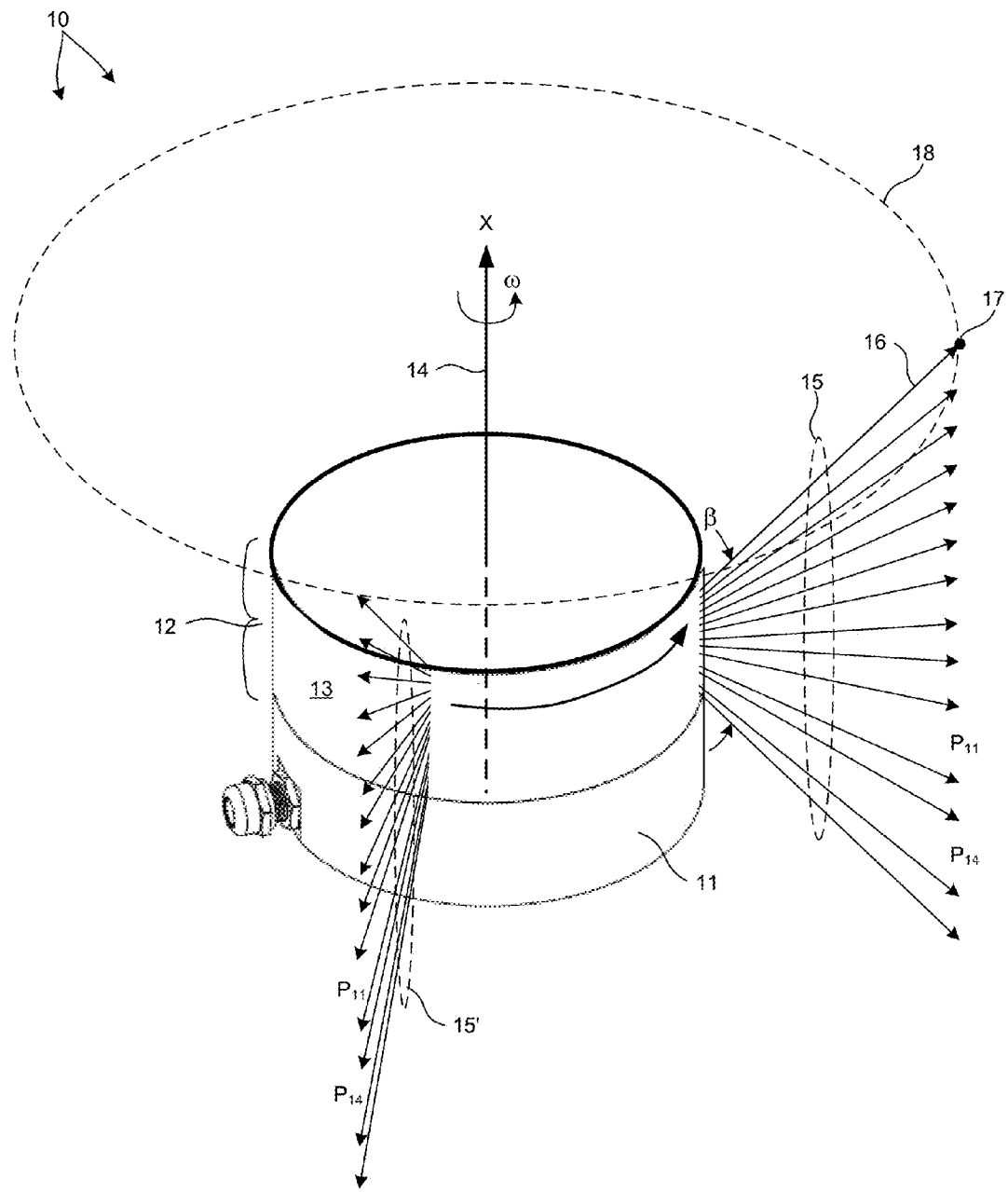
FIG. 2 is a simplified diagram illustrative of another embodiment of a 3-D LIDAR system 10 in at least one novel aspect.

FIG. 2 is a diagram illustrative of another embodiment of a 3-D LIDAR system 10 in one exemplary operational scenario. 3-D LIDAR system 10 includes a lower housing 11 and an upper housing 12 that includes a cylindrical shell element 13 constructed from a material that is transparent to infrared light (e.g., light having a wavelength within the spectral range of 700 to 1,700 nanometers). In one example, cylindrical shell element 13 is transparent to light having a wavelengths centered at 905 nanometers.

As depicted in FIG. 2, a plurality of beams of light 15 are emitted from 3-D LIDAR system 10 through cylindrical shell element 13 over an angular range, $\beta$. In the embodiment depicted in FIG. 2, the chief ray of each beam of light is illustrated. Each beam of light is projected outward into the surrounding environment in a plurality of different directions. For example, beam 16 is projected onto location 17 in the surrounding environment. In some embodiments, each beam of light emitted from system 10 diverges slightly. In one example, a beam of light emitted from system 10 illuminates a spot size of 20 centimeters in diameter at a distance of 100 meters from system 10. In this manner, each beam of illumination light is a cone of illumination light emitted from system 10.

In the embodiment depicted in FIG. 2, 3-D LIDAR system 10 is configured to scan each of the plurality of beams of light 15 about central axis 14. For purposes of illustration, beams of light 15 are illustrated in one angular orientation relative to a non-rotating coordinate frame of 3-D LIDAR system 10 and beams of light 15' are illustrated in another angular orientation relative to the non-rotating coordinate frame. As the beams of light 15 rotate about central axis 14, each beam of light projected into the surrounding environment (e.g., each cone of illumination light associated with each beam) illuminates a volume of the environment corresponding the cone shaped illumination beam as it is swept around central axis 14.

Figure 3:
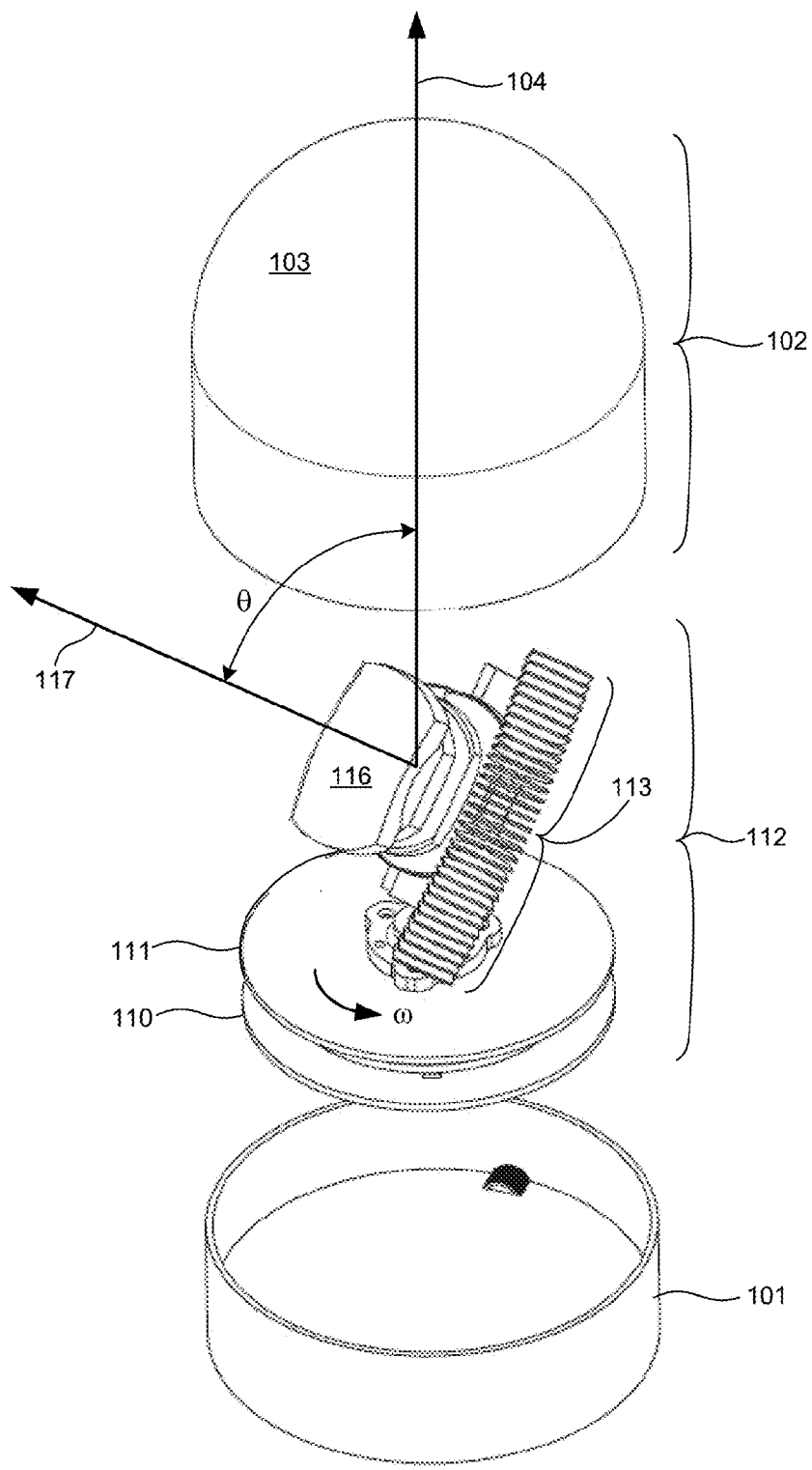
FIG. 3 depicts an exploded view of 3-D LIDAR system 100 in one exemplary embodiment.

FIG. 3 depicts an exploded view of 3-D LIDAR system 100 in one exemplary embodiment. 3-D LIDAR system 100 further includes a light emission/collection engine 112 that rotates about central axis 104. In the embodiment depicted in FIG. 3, a central optical axis 117 of light emission/collection engine 112 is tilted at an angle, $\theta$, with respect to central axis 104. As depicted in FIG. 3, 3-D LIDAR system 100 includes a stationary electronics board 110 mounted in a fixed position with respect to lower housing 101. Rotating electronics board 111 is disposed above stationary electronics board 110 and is configured to rotate with respect to stationary electronics board 110 at a predetermined rotational velocity (e.g., more than 200 revolutions per minute). Electrical power signals and electronic signals are communicated between stationary electronics board 110 and rotating electronics board 111 over one or more transformer, capacitive, or optical elements, resulting in a contactless transmission of these signals. Light emission/collection engine 112 is fixedly positioned with respect to the rotating electronics board 111, and thus rotates about central axis 104 at the predetermined angular velocity, w.

As depicted in FIG. 3, light emission/collection engine 112 includes an array of integrated LIDAR measurement devices 113. In one aspect, each integrated LIDAR measurement device includes a light emitting element, a light detecting element, and associated control and signal conditioning electronics integrated onto a common substrate (e.g., printed circuit board or other electrical circuit board).

Light emitted from each integrated LIDAR measurement device passes through a series of optical elements 116 that collimate the emitted light to generate a beam of illumination light projected from the 3-D LIDAR system into the environment. In this manner, an array of beams of light 105, each emitted from a different LIDAR measurement device are emitted from 3-D LIDAR system 100 as depicted in FIG. 1. In general, any number of LIDAR measurement devices can be arranged to simultaneously emit any number of light beams from 3-D LIDAR system 100. Light reflected from an object in the environment due to its illumination by a particular LIDAR measurement device is collected by optical elements 116. The collected light passes through optical elements 116 where it is focused onto the detecting element of the same, particular LIDAR measurement device. In this manner, collected light associated with the illumination of different portions of the environment by illumination generated by different LIDAR measurement devices is separately focused onto the detector of each corresponding LIDAR measurement device.

Figure 4:
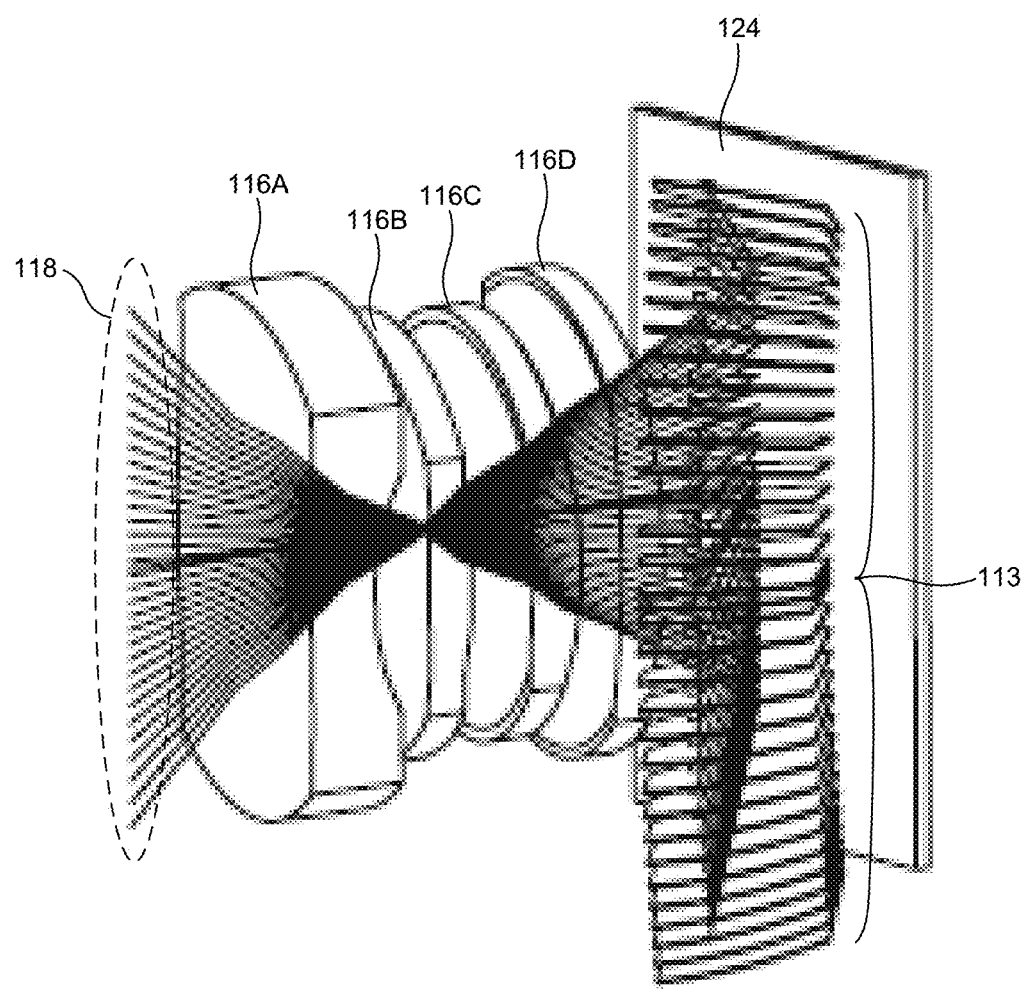
FIG. 4 depicts a view of collection optics 116 of 3-D LIDAR system 100 in greater detail.

FIG. 4 depicts a view of optical elements 116 in greater detail. As depicted in FIG. 4, optical elements 116 include four lens elements 116A-D arranged to focus collected light 118 onto each detector of the array of integrated LIDAR measurement devices 113. In the embodiment depicted in FIG. 4, light passing through optics 116 is reflected from mirror 124 and is directed onto each detector of the array of integrated LIDAR measurement devices 113. In some embodiments, one or more of the optical elements 116 is constructed from one or more materials that absorb light outside of a predetermined wavelength range. The predetermined wavelength range includes the wavelengths of light emitted by the array of integrated LIDAR measurement devices 113. In one example, one or more of the lens elements are constructed from a plastic material that includes a colorant additive to absorb light having wavelengths less than infrared light generated by each of the array of integrated LIDAR measurement devices 113. In one example, the colorant is Epolight 7276A available from Aako BV (The Netherlands). In general, any number of different colorants can be added to any of the plastic lens elements of optics 116 to filter out undesired spectra.

Figure 5:
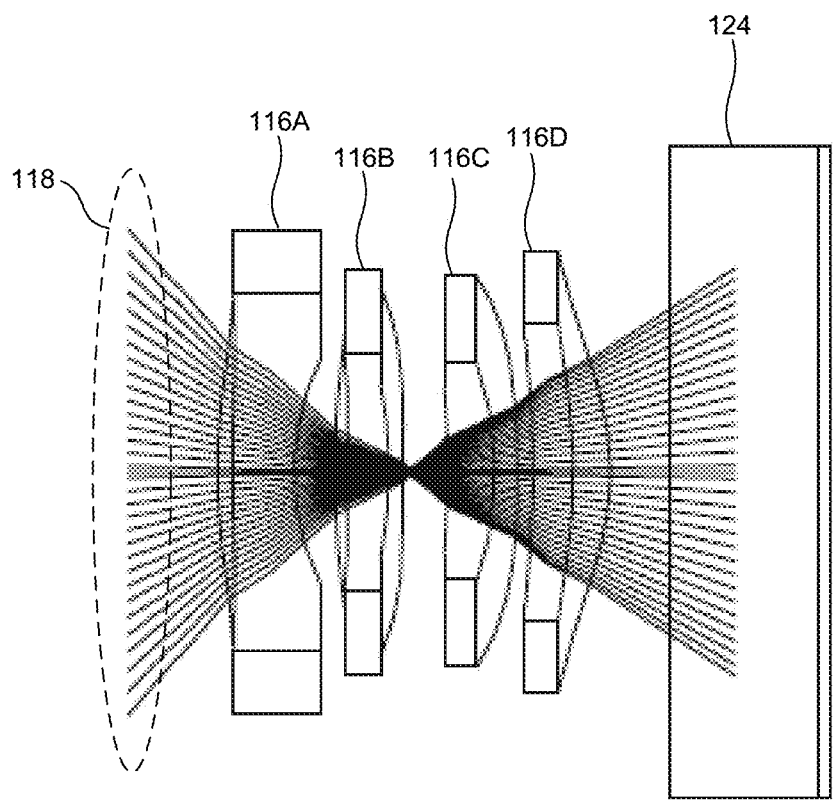
FIG. 5 depicts a cutaway view of collection optics 116 of 3-D LIDAR system 100 that illustrates the shaping of each beam of collected light 118.

FIG. 5 depicts a cutaway view of optics 116 to illustrate the shaping of each beam of collected light 118.

A LIDAR system, such as 3-D LIDAR system 10 depicted in FIG. 2, and system 100, depicted in FIG. 1, includes a plurality of integrated LIDAR measurement devices each emitting a pulsed beam of illumination light from the LIDAR device into the surrounding environment and measuring return light reflected from objects in the surrounding environment.

Figure 6:
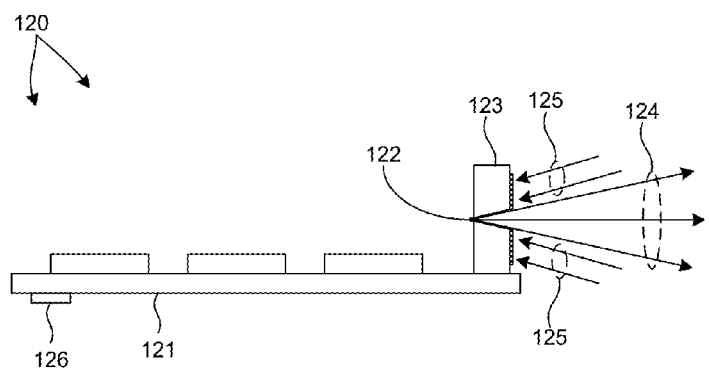
FIG. 6 is a simplified diagram illustrative of an integrated LIDAR measurement device in one embodiment.

FIG. 6 depicts an integrated LIDAR measurement device 120 in one embodiment. Integrated LIDAR measurement device 120 includes a pulsed light emitting device 122, a light detecting element 123, associated control and signal conditioning electronics integrated onto a common substrate 121 (e.g., electrical board), and connector 126. Pulsed emitting device 122 generates pulses of illumination light 124 and detector 123 detects collected light 125. Integrated LIDAR measurement device 120 generates digital signals indicative of the distance between the 3-D LIDAR system and an object in the surrounding environment based on a time of flight of light emitted from the integrated LIDAR measurement device 120 and detected by the integrated LIDAR measurement device 120. Integrated LIDAR measurement device 120 is electrically coupled to the 3-D LIDAR system via connector 126. Integrated LIDAR measurement device 120 receives control signals from the 3-D LIDAR system and communicates measurement results to the 3-D LIDAR system over connector 126.

Figure 7:
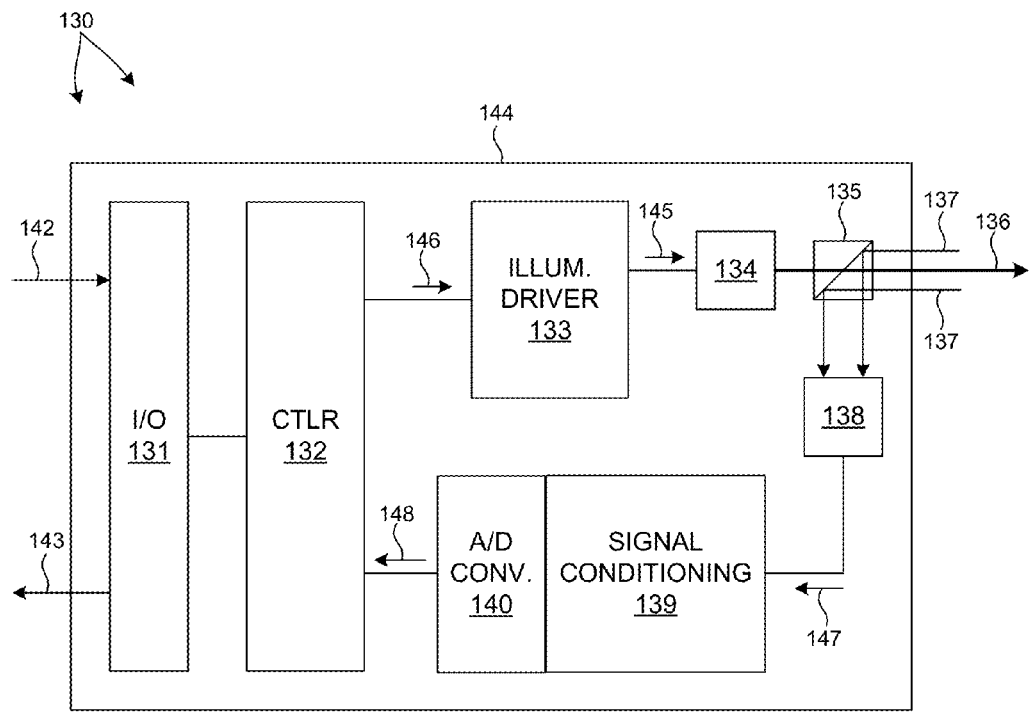
FIG. 7 is a simplified schematic diagram illustrative of an integrated LIDAR measurement device in another embodiment.

FIG. 7 depicts a schematic view of an integrated LIDAR measurement device 130 in another embodiment. Integrated LIDAR measurement device 130 includes a pulsed light emitting device 134, a light detecting element 138, a beam splitter 135 (e.g., polarizing beam splitter, non-polarizing beam splitter, dielectric film, etc.), an illumination driver 133, signal conditioning electronics 139, analog to digital (A/D) conversion electronics 140, controller 132, and digital input/output (I/O) electronics 131 integrated onto a common substrate 144. In some embodiments, these elements are individually mounted to a common substrate (e.g., printed circuit board). In some embodiments, groups of these elements are packaged together and the integrated package is mounted to a common substrate. In general, each of the elements are mounted to a common substrate to create an integrated device, whether they are individually mounted or mounted as part of an integrated package.

Figure 8:
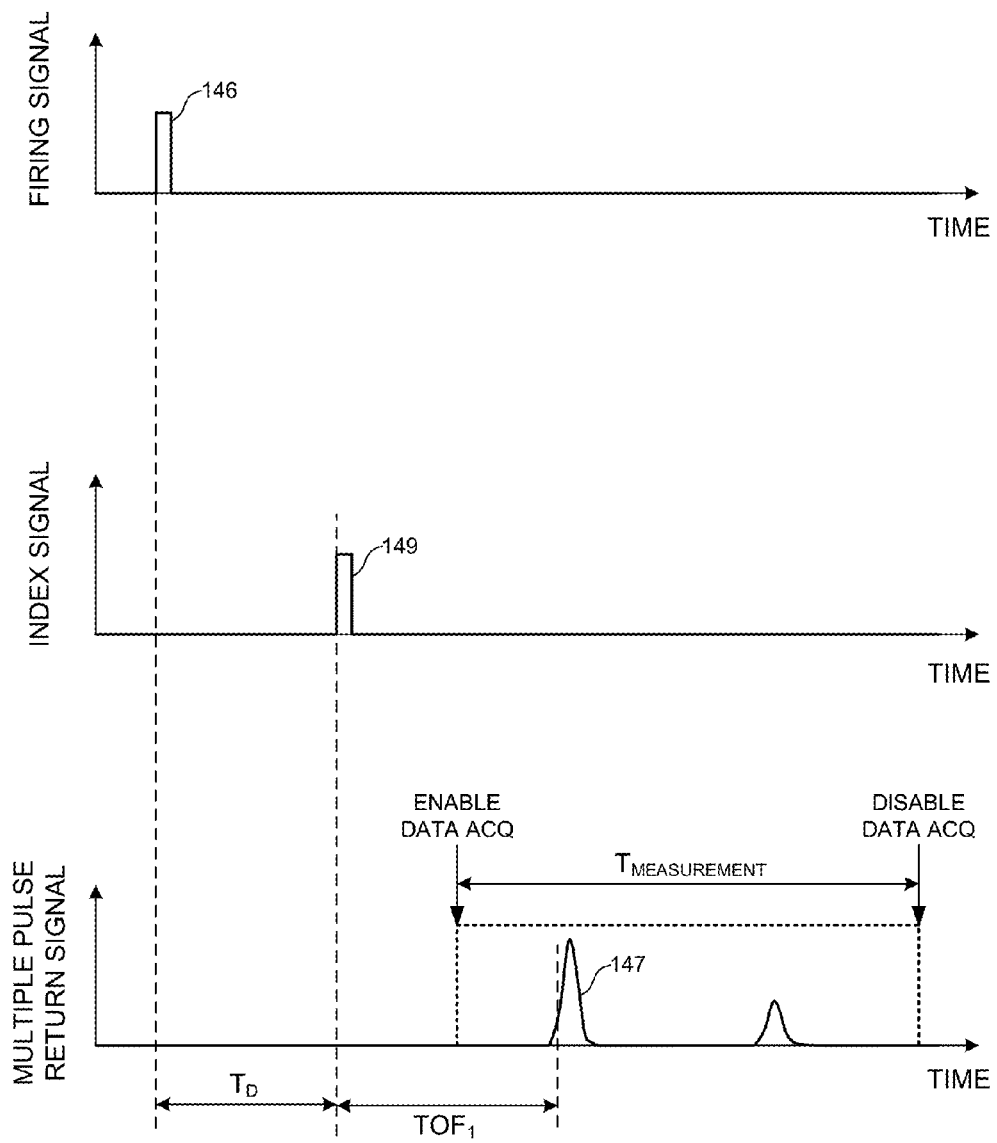
FIG. 8 depicts an illustration of the timing associated with the emission of a measurement pulse from an integrated LIDAR measurement device and capture of the returning measurement pulse.

FIG. 8 depicts an illustration of the timing associated with the emission of a measurement pulse from an integrated LIDAR measurement device 130 and capture of the returning measurement pulse. As depicted in FIGS. 7 and 8, the measurement begins with a pulse firing signal 146 generated by controller 132. Due to internal system delay, a pulse index signal 149 is determined by controller 132 that is shifted from the pulse firing signal 146 by a time delay, $T_D$. The time delay includes the known delays associated with emitting light from the LIDAR system (e.g., signal communication delays and latency associated with the switching elements, energy storage elements, and pulsed light emitting device) and known delays associated with collecting light and generating signals indicative of the collected light (e.g., amplifier latency, analog-digital conversion delay, etc.).

As depicted in FIGS. 7 and 8, a return signal 147 is detected by the LIDAR system in response to the illumination of a particular location. A measurement window (i.e., a period of time over which collected return signal data is associated with a particular measurement pulse) is initiated by enabling data acquisition from detector 138. Controller 132 controls the timing of the measurement window to correspond with the window of time when a return signal is expected in response to the emission of a measurement pulse sequence. In some examples, the measurement window is enabled at the point in time when the measurement pulse sequence is emitted and is disabled at a time corresponding to the time of flight of light over a distance that is substantially twice the range of the LIDAR system. In this manner, the measurement window is open to collect return light from objects adjacent to the LIDAR system (i.e., negligible time of flight) to objects that are located at the maximum range of the LIDAR system. In this manner, all other light that cannot possibly contribute to useful return signal is rejected.

As depicted in FIG. 8, return signal 147 includes two return measurement pulses that correspond with the emitted measurement pulse. In general, signal detection is performed on all detected measurement pulses. Further signal analysis may be performed to identify the closest signal (i.e., first instance of the return measurement pulse), the strongest signal, and the furthest signal (i.e., last instance of the return measurement pulse in the measurement window). Any of these instances may be reported as potentially valid distance measurements by the LIDAR system. For example, a time of flight, $TOF_1$, may be calculated from the closest (i.e., earliest) return measurement pulse that corresponds with the emitted measurement pulse as depicted in FIG. 8.

In some embodiments, the signal analysis is performed by controller 132, entirely. In these embodiments, signals 143 communicated from integrated LIDAR measurement device 130 include an indication of the distances determined by controller 132. In some embodiments, signals 143 include the digital signals 148 generated by A/D converter 140. These raw measurement signals are processed further by one or more processors located on board the 3-D LIDAR system, or external to the 3-D LIDAR system to arrive at a measurement of distance. In some embodiments, controller 132 performs preliminary signal processing steps on signals 148 and signals 143 include processed data that is further processed by one or more processors located on board the 3-D LIDAR system, or external to the 3-D LIDAR system to arrive at a measurement of distance.

In some embodiments a 3-D LIDAR system includes multiple integrated LIDAR measurement devices, such as the LIDAR systems illustrated in FIGS. 1-3. In some embodiments, a delay time is set between the firing of each integrated LIDAR measurement device. Signal 142 includes an indication of the delay time associated with the firing of integrated LIDAR measurement device 130. In some examples, the delay time is greater than the time of flight of the measurement pulse sequence to and from an object located at the maximum range of the LIDAR device. In this manner, there is no cross-talk among any of the integrated LIDAR measurement devices. In some other examples, a measurement pulse is emitted from one integrated LIDAR measurement device before a measurement pulse emitted from another integrated LIDAR measurement device has had time to return to the LIDAR device. In these embodiments, care is taken to ensure that there is sufficient spatial separation between the areas of the surrounding environment interrogated by each beam to avoid cross-talk.

Illumination driver 133 generates a pulse electrical current signal 145 in response to pulse firing signal 146. Pulsed light emitting device 134 generates pulsed light emission 136 in response to pulsed electrical current signal 145. The illumination light 136 is focused and projected onto a particular location in the surrounding environment by one or more optical elements of the LIDAR system (not shown).

In some embodiments, the pulsed light emitting device is laser based (e.g., laser diode). In some embodiments, the pulsed illumination sources are based on one or more light emitting diodes. In general, any suitable pulsed illumination source may be contemplated.

In some embodiments, digital I/O 131, timing logic 132, A/D conversion electronics 140, and signal conditioning electronics 139 are integrated onto a single, silicon-based microelectronic chip. In another embodiment, these same elements are integrated into a single gallium-nitride or silicon based circuit that also includes the illumination driver. In some embodiments, the A/D conversion electronics and controller 132 are combined as a time-to-digital converter.

As depicted in FIG. 7, return light 137 reflected from the surrounding environment is detected by light detector 138. In some embodiments, light detector 138 is an avalanche photodiode. Light detector 138 generates an output signal 147 that is amplified by signal conditioning electronics 139. In some embodiments, signal conditioning electronics 139 includes an analog trans-impedance amplifier. However, in general, the amplification of output signal 147 may include multiple, amplifier stages. In this sense, an analog trans-impedance amplifier is provided by way of non-limiting example, as many other analog signal amplification schemes may be contemplated within the scope of this patent document.

The amplified signal is communicated to A/D converter 140. The digital signals are communicated to controller 132. Controller 132 generates an enable/disable signal employed to control the timing of data acquisition by ADC 140 in concert with pulse firing signal 146.

As depicted in FIG. 7, the illumination light 136 emitted from integrated LIDAR measurement device 130 and the return light 137 directed toward integrated LIDAR measurement device share a common path. In the embodiment depicted in FIG. 7, the return light 137 is separated from the illumination light 136 by a polarizing beam splitter (PBS) 135. PBS 135 could also be a non-polarizing beam splitter, but this generally would result in an additional loss of light. In this embodiment, the light emitted from pulsed light emitting device 134 is polarized such that the illumination light passes through PBS 135. However, return light 137 generally includes a mix of polarizations. Thus, PBS 135 directs a portion of the return light toward detector 138 and a portion of the return light toward pulsed light emitting device 134. In some embodiments, it is desirable to include a quarter waveplate after PBS 135. This is advantageous in situations when the polarization of the return light is not significantly changed by its interaction with the environment. Without the quarter waveplate, the majority of the return light would pass through PBS 135 and be directed toward the pulsed light emitting device 134, which is undesireable. However, with the quarter waveplate, the majority of the return light will pass through PBS 135 and be directed toward detector 138.

However, in general, when the polarization of the return light is completely mixed and a single PBS is employed as depicted in FIG. 7, half of the return light will be directed toward detector 138, and the other half will be directed toward pulse light emitting device 134, regardless of whether a quarter waveplate is used.

FIGS. 9-17 depict various embodiments to avoid these losses.

Figure 9:
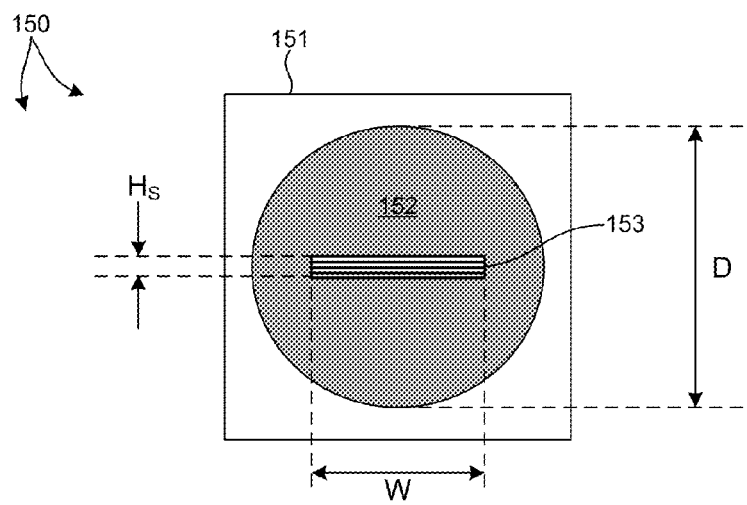
FIG. 9 depicts a front view of an embodiment of an integrated LIDAR measurement device including a detector having a slot through which illumination light is projected from an illumination source.

FIG. 9 depicts a front view of an embodiment 150 of an integrated LIDAR measurement device including a detector 151 (e.g., an avalanche photodiode) having a circular shaped active area 152 with a diameter, D. In one example, the diameter of the active area 152 is approximately 300 micrometers. In one aspect, detector 151 includes a slot 153 all the way through the detector. In one example, the slot has a height, $H_S$, of approximately 70 micrometers and a width, W, of approximately 200 micrometers.

Figure 10:
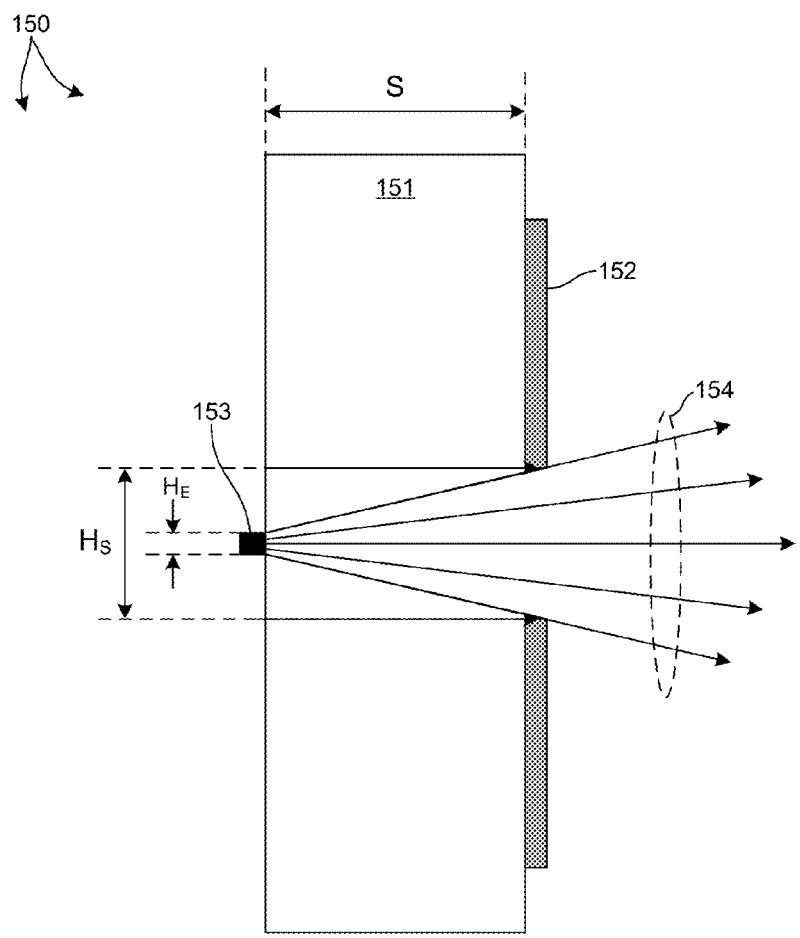
FIG. 10 depicts a side view of the embodiment depicted in FIG. 9.

FIG. 10 depicts a side view of embodiment 150 depicted in FIG. 9. As depicted in FIG. 10, embodiment 150 also includes pulsed light emitting device 153 fixed to the back of avalanche photodiode detector 151 and configured to emit illumination light 154 through slot 153 in detector 151. In one example, pulse light emitting device 153 include three laser diodes packaged together to create an emission area having a height, $H_E$, of 10 micrometers with a divergence angle of approximately 15 degrees. In this example, the thickness, S, of the detector 151 is approximately 120 micrometers.

In this manner, detector 151 and pulsed light emitting device 153 are located in the beam path of light emitted from an integrated LIDAR measurement device and returned to the integrated LIDAR measurement device. Although a certain amount of return light will be directed toward slot 153 and not detected, the relatively small area of slot 153 compared to the active area 152 of detector 151 ensures that the majority of the return light will be detected.

Figure 11:
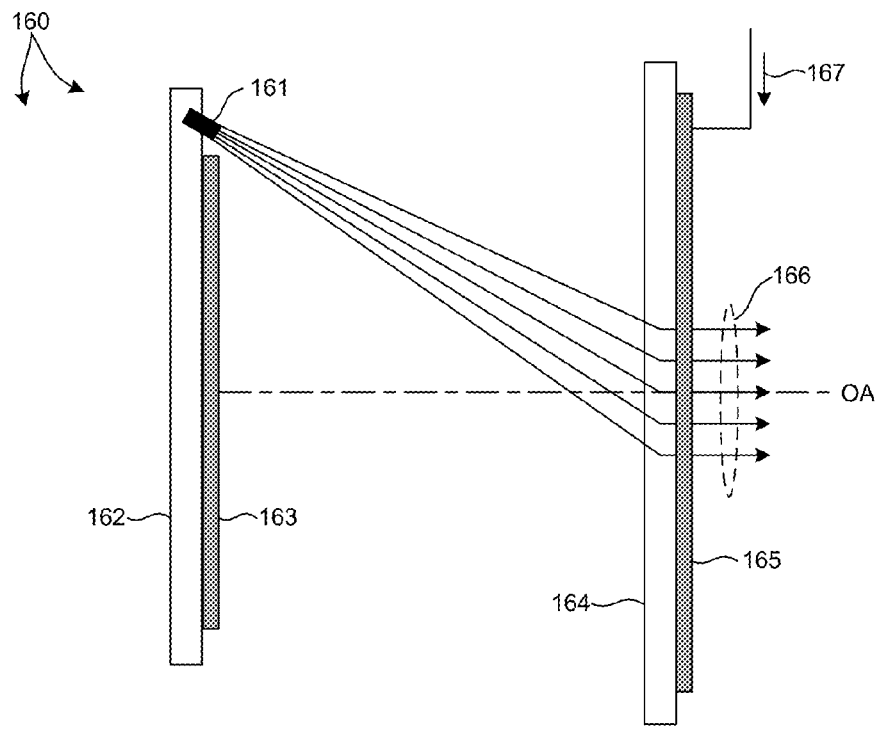
FIG. 11 depicts a side view of an embodiment of an integrated LIDAR measurement device including an active optical element in one state that causes illumination light to refract toward a shared optical path.

FIG. 11 depicts a side view of an embodiment 160 of an integrated LIDAR measurement device including a detector 162 having an active area 163, a pulsed light emitting device 161 located outside of the active area 163, a focusing optic 164 and an active optical element 165. Active optical element 165 is coupled to a controller of the integrated LIDAR measurement device. The controller communicates control signal 167 to active element 165 that causes the active optical element to change states.

In a first state, depicted in FIG. 11, the active optical element changes its effective index of refraction and causes the light 166 emitted from pulsed light emitting device 161 to refract toward optical axis, OA.

Figure 12:
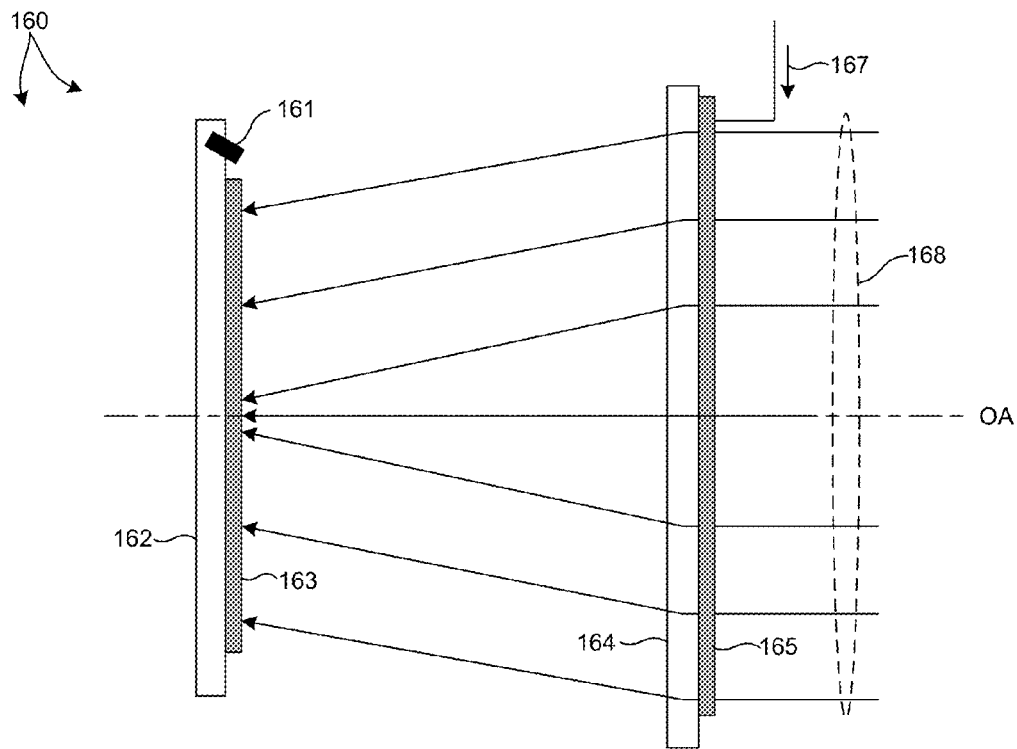
FIG. 12 depicts a side view of the embodiment depicted in FIG. 11 including the active optical element in another state that causes return light to be directed toward a detector.

In a second state, depicted in FIG. 12, the active optical element changes its effective index of refraction such that return light 168 passes through active optical element 165 and focusing optic 164 toward the active area 163 of detector 162. During this state, the controller controls pulsed light emitting device 161 such that it does not emit light.

In this embodiment, the light emitted by pulsed light emitting device 161 is not initially aligned with the optical axis of the optical system. However, during periods of time when light is emitted from the pulsed light emitting device 161, active optical element changes its state such that the illumination light is aligned with the optical axis of the optical system. In some embodiments, the active optical element is a phase array. In some embodiments, the active optical element is a acousto-optical modulator. In some embodiments, the active optical element is a surface acoustic wave modulator. In general, many active devices capable of altering their effective index of refraction may be contemplated.

Figure 13:
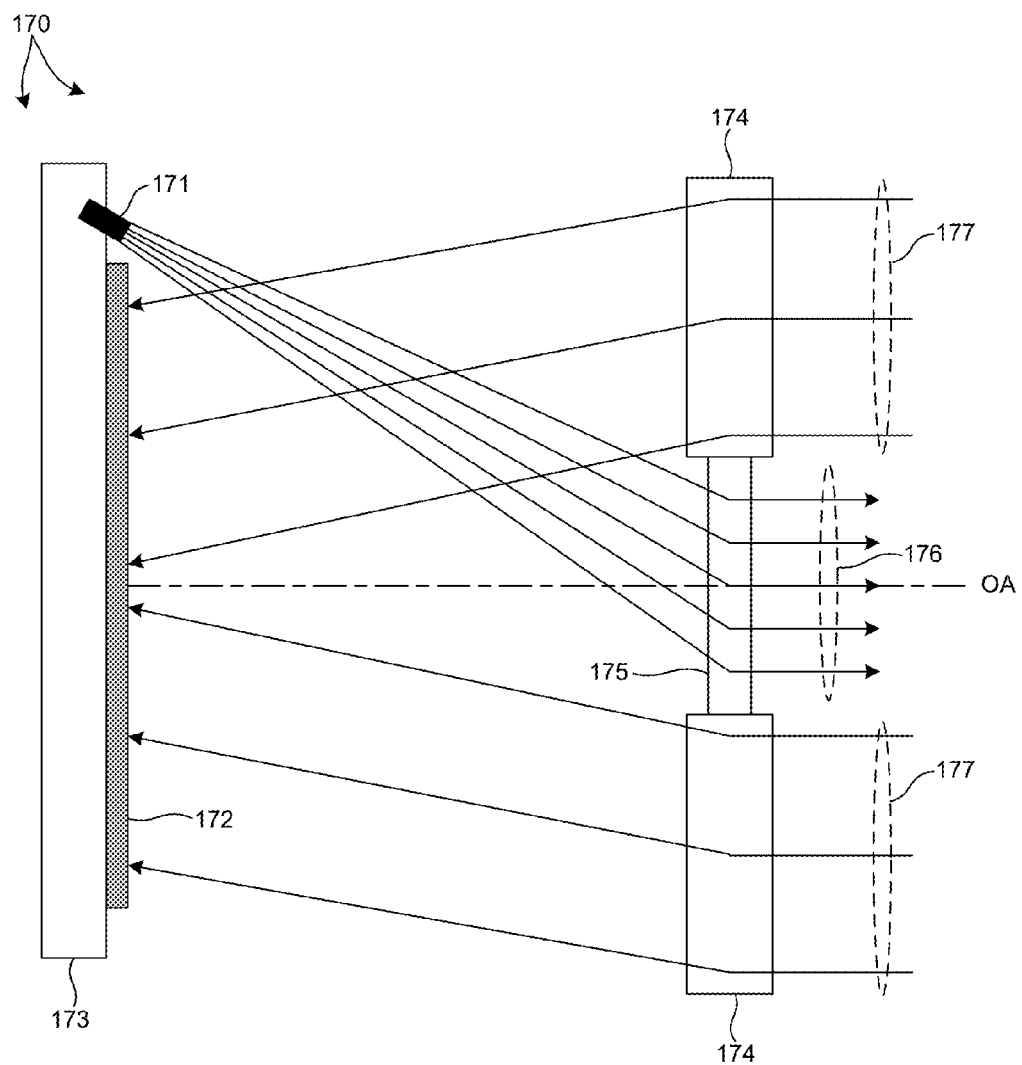
FIG. 13 depicts a side view of an embodiment of an integrated LIDAR measurement device including a concentric focusing optic to focus return light onto a detector and another optical element that causes illumination light to refract toward a shared optical path.

FIG. 13 depicts a side view of an embodiment 170 of an integrated LIDAR measurement device including a detector 173 having an active area 172, a pulsed light emitting device 171 located outside of the active area 172, concentric focusing optics 174 and focusing optics 175 centered along the optical axis of the integrated LIDAR measurement device. As depicted in FIG. 13, the return light 177 is focused onto the active area 172 of detector 173 by concentric focusing optics 174. In addition, light 176 emitted from pulsed light emitting device 171 is refracted toward optical axis, OA, and collimated by focusing optics 175. As depicted in FIG. 13, focusing optics 175 occupy a relatively small area immediately centered about the optical axis. Concentric focusing optics are also centered about the optical axis, but are spaced apart from the optical axis.

Figure 14:
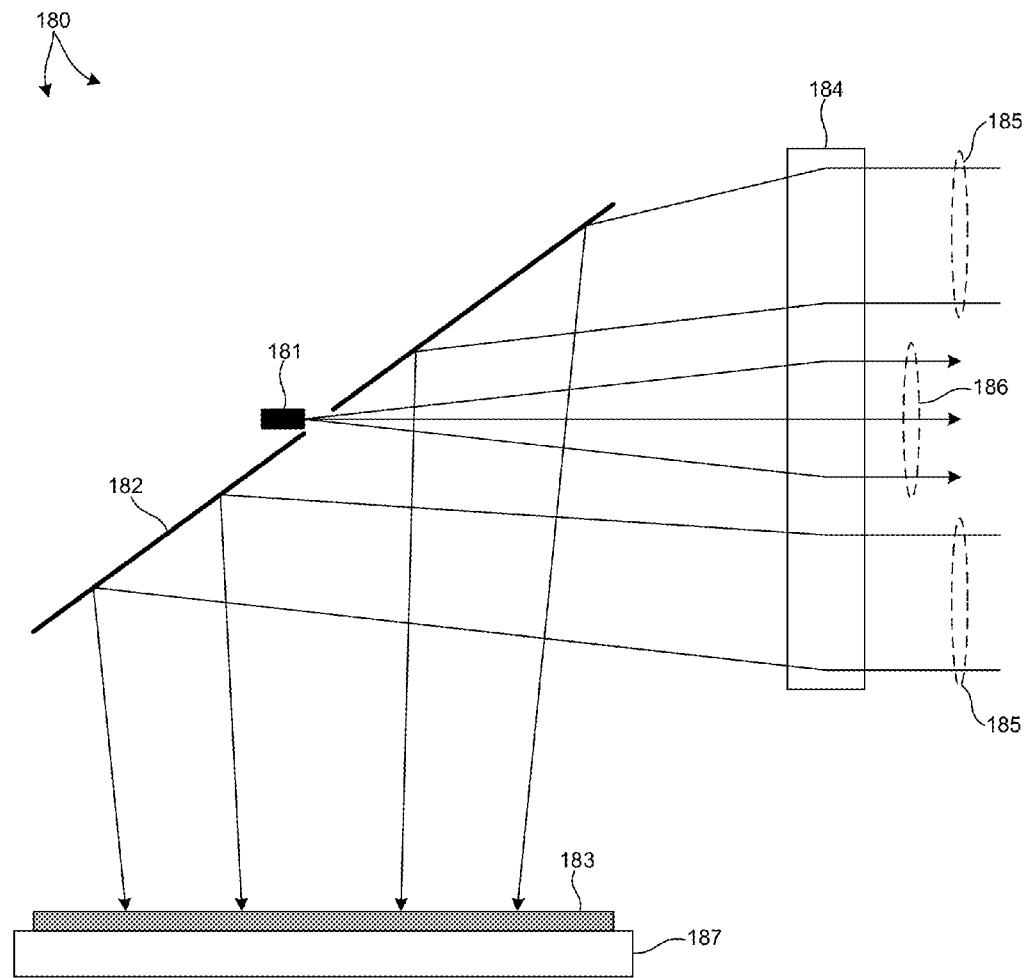
FIG. 14 depicts a top view of an embodiment of an integrated LIDAR measurement device including a mirror in the return path having a slot through which illumination light is passed.

FIG. 14 depicts a top view of an embodiment 180 of an integrated LIDAR measurement device including a detector 187 having an active area 183, a pulsed light emitting device 181 located outside of the active area 183, concentric focusing optics 184, and mirror 182. As depicted in FIG. 14, return light 185 is focused by focusing optics 184 and reflects from mirror 182 toward the active area 183 of detector 182. In one aspect, mirror 182 includes a slot through which light emitted from pulsed light emitting device 181 is passed. Illumination light 186 is emitted from pulsed light emitting device 181, passes through the slot in mirror 182, is collimated by focusing optics 184, and exits the integrated LIDAR measurement device.

Figure 15A:
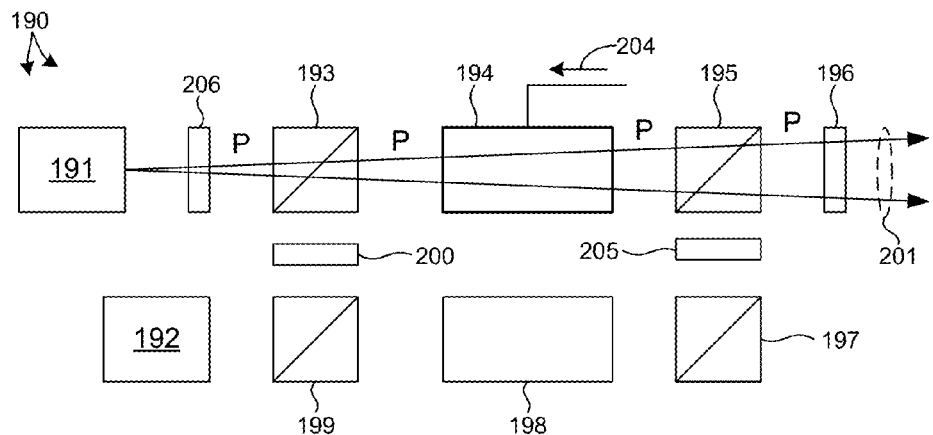
FIGS. 15A-C depict three different light paths through an embodiment of an integrated LIDAR measurement device employing a polarization control element.
Figure 15B:
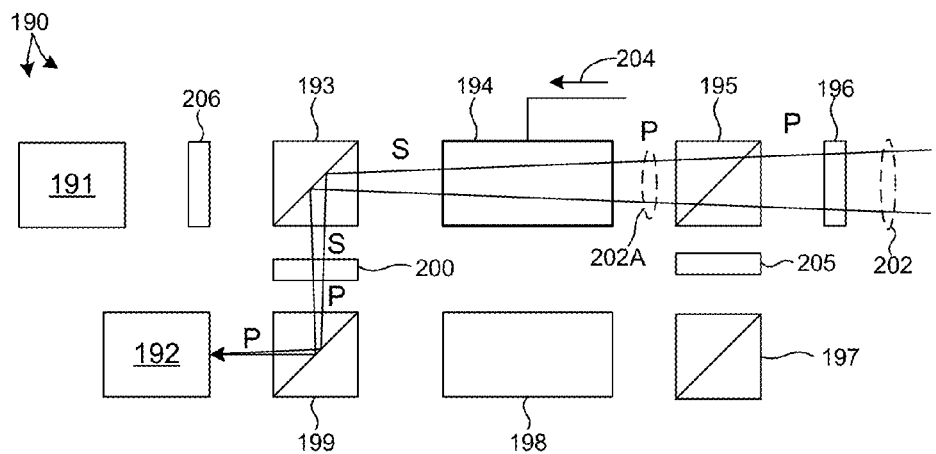
Figure 15C:
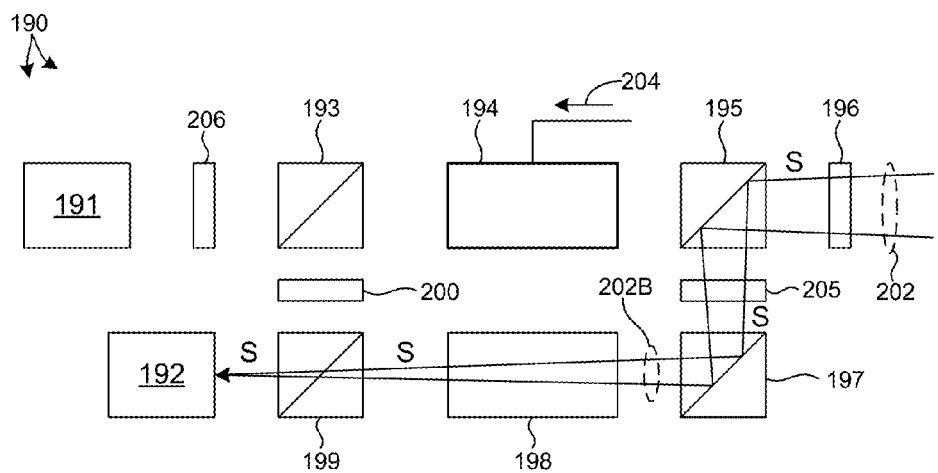

FIGS. 15A-C depict three different light paths through an embodiment 190 of an integrated LIDAR measurement device. This embodiment includes a pulsed light emitting device 191, a PBS 193, a polarization control element 194 (e.g., Pockels cell), a PBS 195, a quarter waveplate 196, mirror element 197 (e.g., a PBS, a half cube with total internal reflection, etc.), delay element 198, polarizing beam combiner 199, half waveplate 200, and detector 192. Polarization control element 194 is coupled to a controller of the integrated LIDAR measurement device. The controller communicates control signal 204 to polarization control element 194 that causes the polarization control element to alter the polarization state of light passing through the polarization control element in accordance with control signal 204.

In a first state, depicted in FIG. 15A, polarization control element 194 is configured not to change the polarization of light passing through when illumination light 201 is emitted from pulsed light emitting device 191. FIG. 15A depicts the path of illumination light 201 through embodiment 190. Illumination light 201 passes through PBS 193, polarization control element 194, PBS 195, and quarter waveplate 196. In the examples depicted in FIGS. 15A-C, the pulsed light emitting device 191 emits p-polarized light, and the PBS elements 193 and 194 are configured to directly transmit p-polarized light. However, in general, different polarizations may be utilized to achieve the same result.

In a second state, depicted in FIGS. 15B and 15C, polarization control element 194 is configured to change the polarization of light passing through when return light 202 is detected by detector 192, and light is not emitted from pulsed light emitting device 191.

FIG. 15B depicts the path of a portion 202A of return light 202 that is p-polarized after passing through quarter waveplate 196. The p-polarized return light passes through PBS 195 and polarization control element 194. In this state, polarization control element 194 switches the polarization of the return light from p-polarization to s-polarization. The s-polarized return light is reflected from PBS 193 toward half waveplate 200. Half waveplate 200 switches the polarization again from s-polarization back to p-polarization. polarizing beam combiner 199 reflects the p-polarized light toward detector 192.

FIG. 15C depicts the path 202B of the portion of return light 202 that is s-polarized after passing through quarter waveplate 196. The s-polarized return light is reflected from beam splitter 195 to mirror element 197, through beam delay element 198, through polarizing beam combiner 199, which directly transmits the s-polarized light onto detector 192.

Beam delay element 198 is introduced to balance the optical path lengths of the s and p polarized return light. Beam delay element may be simply a piece of optical glass of appropriate length.

Embodiment 190 also includes a beam path extension element 206 located in the illumination beam path between the pulsed light emitting device 191 and polarizing beam splitter 193. In some embodiments, beam path extension element 206 is simply a piece of optical glass of appropriate length. Beam path extension element 206 is configured to equalize the illumination path length and the length of the return paths 202A and 202B. Note that the return path lengths 202A and 202B are equalized by beam delay element 198. Since the return paths 202A and 202B pass through additional elements, their effective optical path is longer. By equalizing the illumination path length with the length of the return paths, the return beam is focused to a spot size that approaches the size of the illumination output aperture. This enables the use of the smallest sized detector with the least amount of noise and sensitivity to sun noise and highest bandwidth.

Embodiment 190 also includes a beam delay element 205 in return path 202B to match the effect of half waveplate 200 in return path 202A.

Due to the finite amount of time required to switch the state of the polarization control element, the LIDAR based measurement of relatively short distances is based on light collected by the return path 202B depicted in FIG. 15C. While the polarization control element is changing state, return light propagating along the path 202A depicted in FIG. 15B will not necessarily be subject to a change in polarization. Thus, this light has a high probability of propagating through PBS 193 to pulsed light emitting device 191, and thus, will not be detected. This situation is acceptable because signal strength is typically not a significant issue for relatively short range measurements.

However, for relatively long range measurements, after a sufficient period of time to ensure that the state of the polarization state switching element has changed, return light propagating down both paths described in FIGS. 15B and 15C is available for detection and distance estimation.

As discussed hereinbefore, quarter waveplate 196 is desireable. When performing relatively short range measurements, only light passing though the return path 202B described in FIG. 15C is available. When the polarization of the return light is completely mixed, half of the light will pass through the path described in FIG. 15C. However, when the return light has reflected from a specular target, the polarization remains unchanged. Without introducing the quarter waveplate 196, light reflected from specular targets would propagate through the path described in FIG. 15B, and would be undetected or significantly weakened for short range measurements when the polarization control element is changing states.

Figure 16:
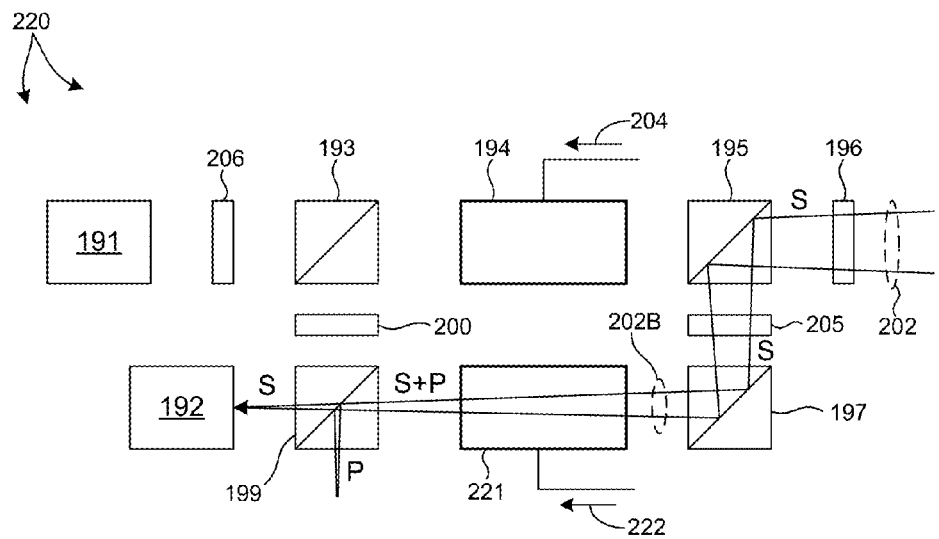
FIG. 16 depicts an embodiment of an integrated LIDAR measurement device that includes an additional polarization control element to effectively control the amount of return light that reaches a detector.

FIG. 16 depicts an embodiment 220 of an integrated LIDAR measurement device that includes an additional polarization control element 221 in return path 202B. Embodiment 220 includes like numbered elements described with reference to embodiment 190. Polarization control elements 194 and 221 effectively control the amount of return light that reaches detector 192. As discussed with reference to FIG. 15B, if polarization control element 194 does not change the polarization state of return light 202A, the light is directed to pulsed light emitting device 191, not detector 192. Conversely, if polarization control element 194 changes the polarization state of return light 202A, the light is directed to detector 192. Similarly, if polarization control element 221 changes the polarization state of return light 202B from s-polarization to p-polarization, the light is directed away from detector 192, and ultimately dumped (i.e., absorbed elsewhere). Conversely, if polarization control element 221 does not change the polarization state of return light 202B, the light is directed toward detector 192. Since the degree of polarization change imparted by polarization control elements 194 and 221 is variably controlled (e.g., Pockels Cells), it follows that the amount of return light that reaches detector 192 is controlled by a controller of the integrated LIDAR measurement device (e.g., controller 132) via control signals 204 and 222.

For example, as discussed hereinbefore, when performing relatively short range measurements, only light passing though the return path 202B described in FIG. 15C and FIG. 16 is available for detection as polarizer control element 194 is transitioned from its state depicted in FIG. 15A. During this period of time, there is a risk that detector 192 saturates. In this scenario, it is desirable to control polarization control element 221 such that the polarization of a portion of return light 202 is partially changed from s-polarization to p-polarization and that the p-polarized light component is dumped before it reaches detector 192.

In general, the timing and profiles of control signals 204 and 222 can be tuned to maximize the dynamic range of detector 192 for different environmental conditions. For example, previously detected signals, signals from other integrated LIDAR measurement devices, images of the surrounding environment, or any combination thereof could be utilized to adjust the dynamic range of detector 192 by changing the timing and profiles of control signals 204 and 222 during operation of an integrated LIDAR measurement device. In one example, the timing and profiles of control signals 204 and 222 are programmed as a function of pulse travel distance. This can be used to avoid detector saturation caused by objects that are close to the sensor. For larger distances measurement sensitivity is maximized and polarization control element 221 is programmed to pass return light 202B without changing its polarization. In this manner, the maximum amount of return light reaches detector 192. Multiple profiles could be used depending on illumination pulse power, features detected in the sensed environment from data collected in a previous return, etc.

Figure 17:
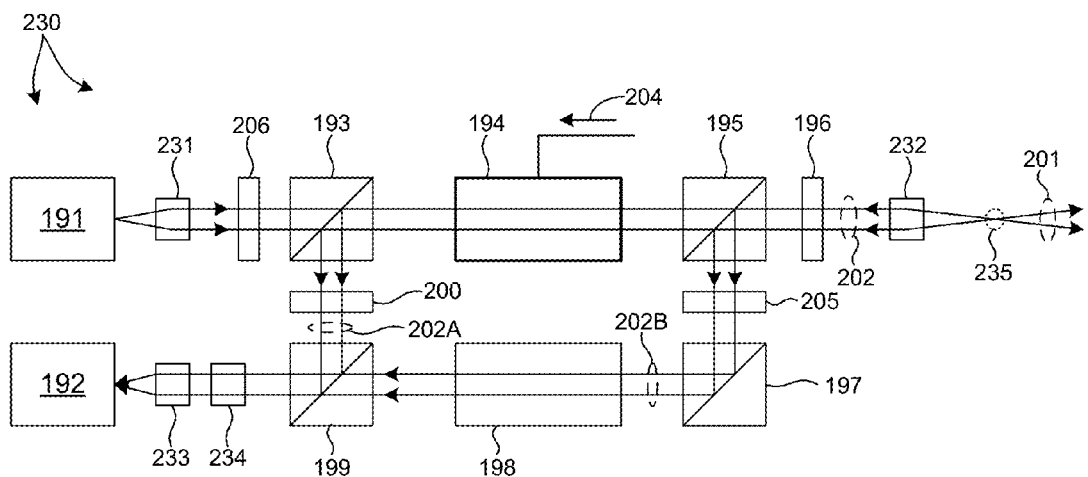
FIG. 17 depicts an embodiment of an integrated LIDAR measurement device that includes additional, optional elements that may be added individually, or in any combination, to the embodiment described with reference to FIGS. 15A-C.

FIG. 17 depicts an embodiment 230 of an integrated LIDAR measurement device that includes additional, optional elements that may be added individually, or in any combination, to embodiment 190 described with reference to FIGS. 15A-C. Embodiment 230 includes like numbered elements described with reference to embodiment 190. As depicted in FIG. 17, collimating optics 231 are located in the optical path between pulsed light emitting device 191 and beam splitter 193. Typically, a pulsed light emitting device based on laser diode technology or light emitting diode technology generates a divergent beam of light. By collimating the illumination light emitted from the pulsed light emitting device, a small beam size is maintained throughout the illumination path. This allows the optical elements in the illumination path to remain small.

Also, embodiment 230 includes a focusing lens 232 after quarter waveplate 196. By refocusing the collomated light transported through the integrated LIDAR measurement device, the output aperture of the illuminating device 191 is re-imaged just outside of the integrated LIDAR measurement device, keeping both the crossection of the integrated LIDAR measurement device and the effective exit and entrance aperture of the integrated measurement device small. This increases possible pixel packaging density and pixel resolution. Since focusing lens 232 is located in the optical path shared by the illumination light and the return light, and the illumination and return paths are balanced, an image point 235 is generated at the output of the integrated LIDAR measurement device. This imaging point 235 is imaged back to both the detector 192 and the pulsed light emitting device 191. Various optical elements such as apertures, field stops, pinhole filters, etc. may be located at image point 235 to shape and filter the images projected onto detector 192. In addition, embodiment 230 includes a focusing optic 233 located in the optical path between the detector 192 and beam combiner 199 to focus the return light onto detector 192.

Also, embodiment 190 includes a spectral filter 234 located in the return beam path between the focusing optic 233 and beam combiner 199. In some embodiments, spectral filter 234 is a bandpass filter that passes light in the spectral band of the illumination beam and absorbs light outside of this spectral band. In many embodiments, spectral filters operate most effectively when incident light is normal to the surface of the spectral filter. Thus, ideally, spectral filter 234 is located in any location in the return beam path where the light is collimated, or closely collimated.

Figure 18:
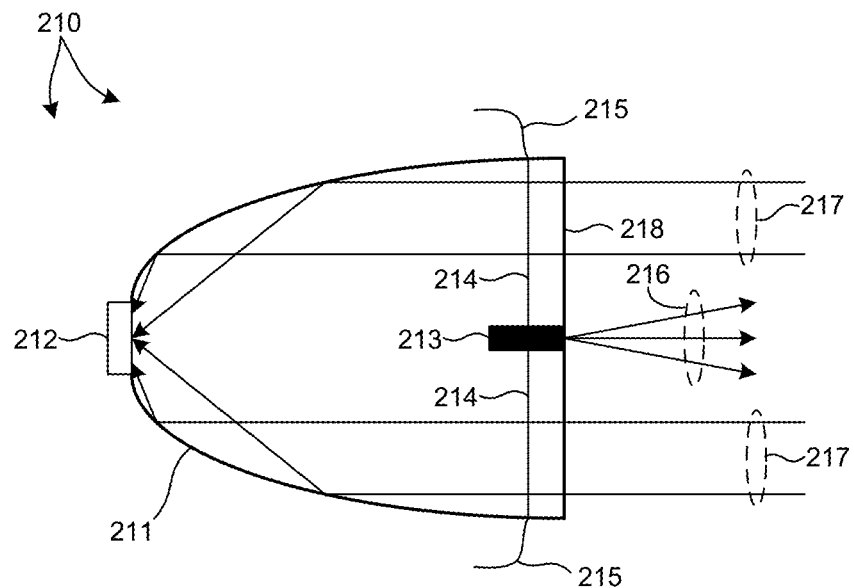
FIG. 18 depicts a side view of an embodiment of an integrated LIDAR measurement device including an illumination source in a common optical path in front of the detector.
Figure 19:
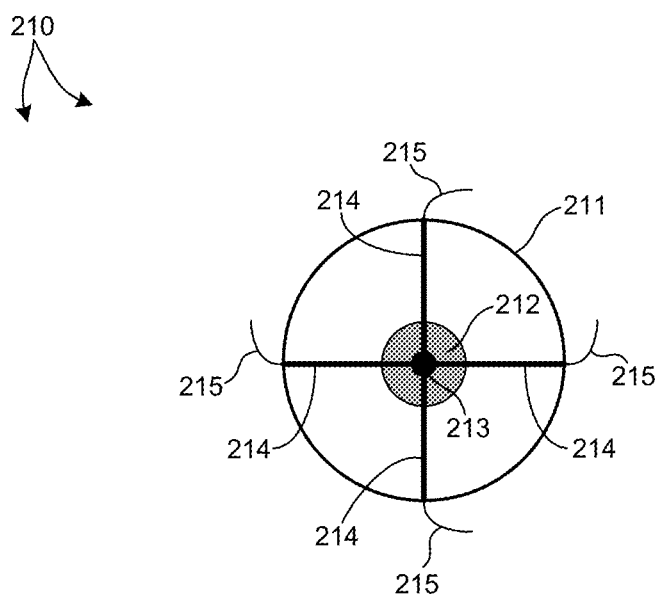
FIG. 19 depicts a front view of the embodiment depicted in FIG. 18.

FIG. 18 depicts a side view of an embodiment 210 of an integrated LIDAR measurement device including a detector 212, a pulsed light emitting device 213 located in front of detector 212 within a lens element 211. FIG. 19 depicts a front view of embodiment 210. As depicted in FIGS. 18-19, return light 217 is collected and focused by lens element 211 (e.g., a compound parabolic concentrator) onto detector 212. Although the input port 218 of lens element 211 is depicted as planar in FIG. 18, in general, the input port 218 may be shaped to focus return light 217 onto detector 212 in any suitable manner. Pulsed light emitting device 213 is located within the envelope of lens element 211 (e.g., molded within lens element 211). Although pulsed light emitting device 213 blocks a certain amount of return light, its small size relative to the collection area of lens element 211 mitigates the negative impact. Conductive elements 214 provide electrical connectivity between pulsed light emitting device 213 and other elements of the integrated LIDAR measurement device (e.g., illumination driver 133) via conductive leads 215. In some embodiments, conductive elements 214 also provide structural support to locate pulsed light emitting device 213 within the envelope of lens element 211.

Figure 20:
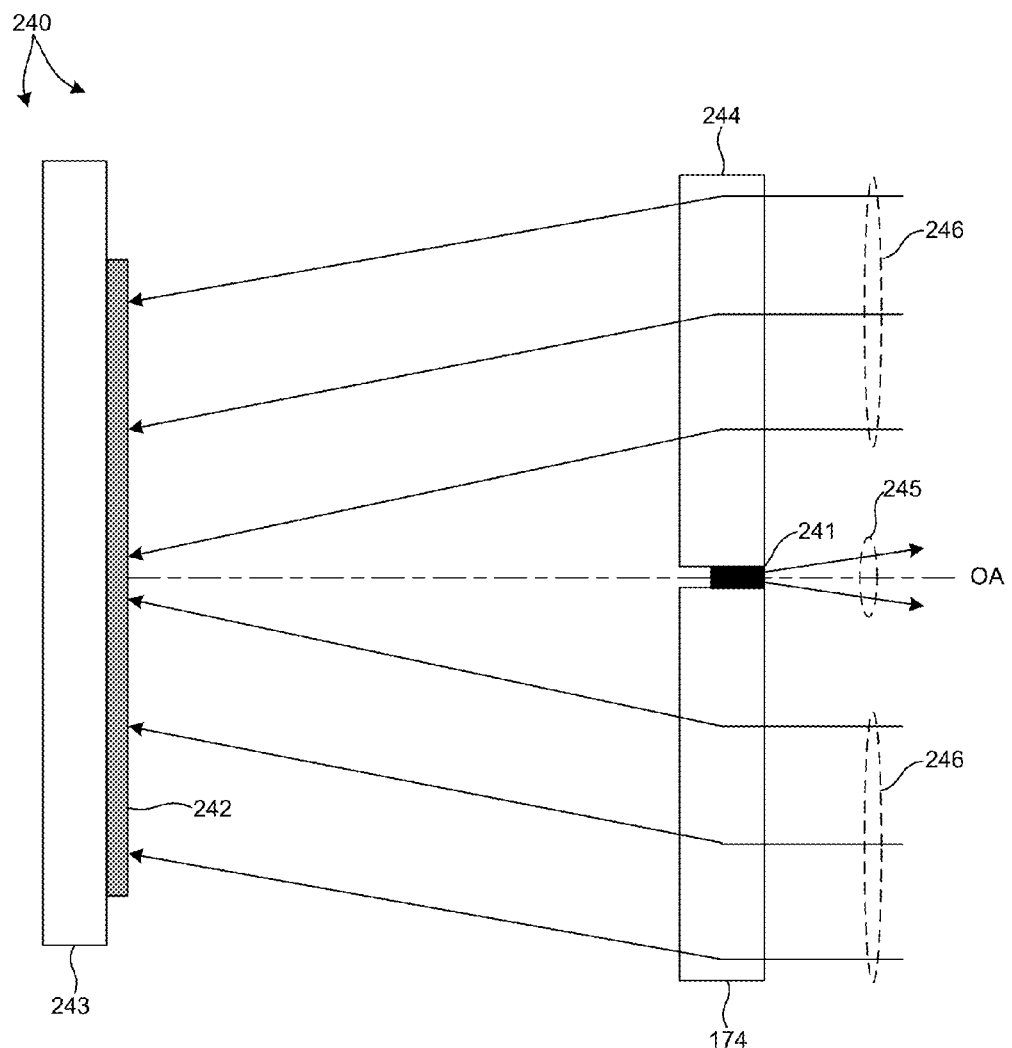
FIG. 20 depicts a side view of an embodiment of an integrated LIDAR measurement device including an illumination source embedded in an optical element in a common optical path in front of the detector.

FIG. 20 depicts a side view of an embodiment 240 of an integrated LIDAR measurement device including a detector 242 and a pulsed light emitting device 241 located in front of detector 242. As depicted in FIG. 20, return light 246 is collected and focused by focusing optics 244 onto detector 242. Pulsed light emitting device 241 is located within focusing optics 244 (e.g., molded with focusing optics 244). Although pulsed light emitting device 241 blocks a certain amount of return light, its small size relative to the collection area of focusing optics 244 mitigates the negative impact. Conductive elements (not shown) provide electrical connectivity between pulsed light emitting device 241 and other elements of the integrated LIDAR measurement device (e.g., illumination driver 133). In some embodiments, the conductive elements also provide structural support to locate pulsed light emitting device 241 within focusing optics 244.

Figure 21:
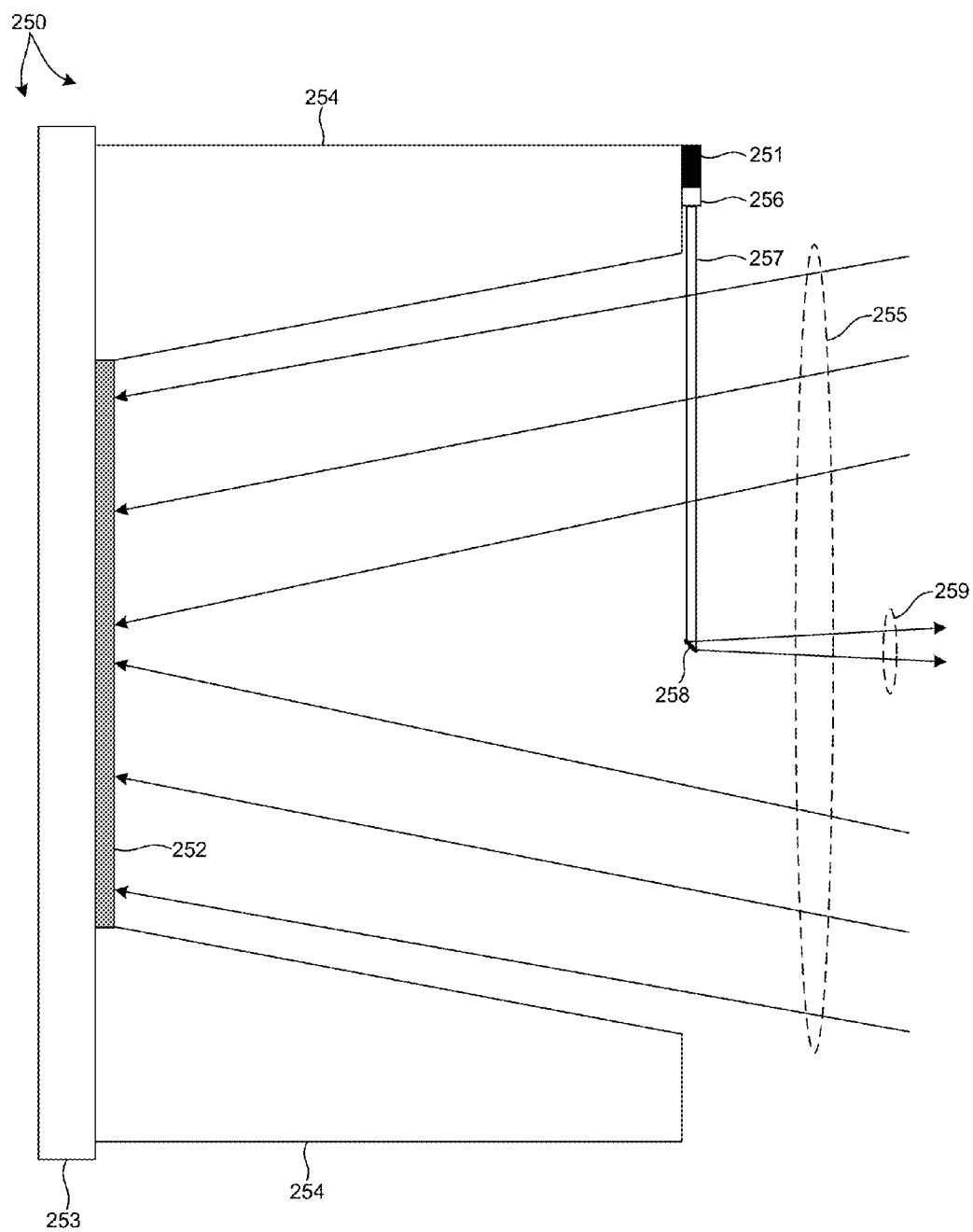
FIG. 21 depicts a side view of an embodiment of an integrated LIDAR measurement device including a waveguide that injects illumination light into a common optical path shared by the illumination light and the return light.

FIG. 21 depicts a side view of an embodiment 250 of an integrated LIDAR measurement device including a detector 253 having an active area 252 and a pulsed light emitting device 251 located outside the field of view of the active area 252 of the detector. As depicted in FIG. 21, a overmold 254 is mounted over the detector. The overmold 254 includes a conical cavity that corresponds with the ray acceptance cone of return light 255. In one aspect, illumination light 259 from illumination source 251 is injected into the detector reception cone by a fiber waveguide 257. An optical coupler 256 optically couples illumination source 251 (e.g., array of laser diodes) with fiber waveguide 257. At the end of the fiber waveguide 257, a mirror element 258 is oriented at a 45 degree angle with respect to the waveguide to inject the illumination light 259 into the cone of return light 255. In one embodiment, the end faces of fiber waveguide 257 are cut at a 45 degree angle and the end faces are coated with a highly reflective dielectric coating to provide a mirror surface. In some embodiments, waveguide 257 includes a rectangular shaped glass core and a polymer cladding of lower index of refraction. In some embodiments, the entire assembly 250 is encapsulated with a material having an index of refraction that closely matches the index of refraction of the polymer cladding. In this manner, the waveguide injects the illumination light 259 into the acceptance cone of return light 255 with minimal occlusion.

The placement of the waveguide 257 within the acceptance cone of the return light projected onto the active sensing area 252 of detector 253 is selected to ensure that the illumination spot and the detector field of view have maximum overlap in the far field.

In some embodiments, such as the embodiments described with reference to FIG. 1 and FIG. 2, an array of integrated LIDAR measurement devices is mounted to a rotating frame of the LIDAR device. This rotating frame rotates with respect to a base frame of the LIDAR device. However, in general, an array of integrated LIDAR measurement devices may be movable in any suitable manner (e.g., gimbal, pan/tilt, etc.) or fixed with respect to a base frame of the LIDAR device.

In some other embodiments, each integrated LIDAR measurement device includes a beam directing element (e.g., a scanning mirror, MEMS mirror etc.) that scans the illumination beam generated by the integrated LIDAR measurement device.

In some other embodiments, two or more integrated LIDAR measurement devices each emit a beam of illumination light toward a scanning mirror device (e.g., MEMS mirror) that reflects the beams into the surrounding environment in different directions.

Figure 22:
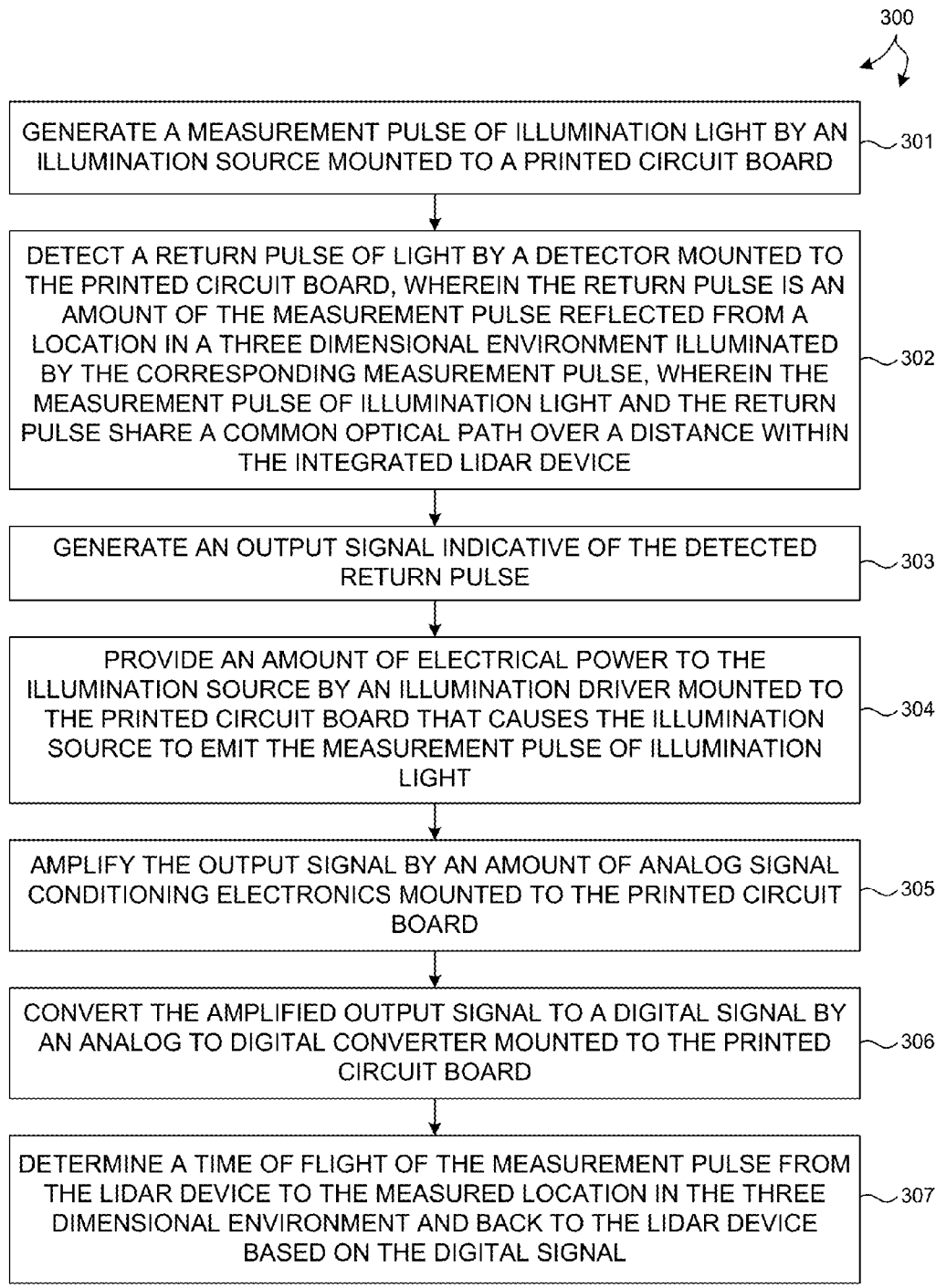
FIG. 22 depicts a flowchart illustrative of a method 300 of performing LIDAR measurements in at least one novel aspect.

FIG. 22 illustrates a method 300 of performing LIDAR measurements in at least one novel aspect. Method 300 is suitable for implementation by a LIDAR system such as LIDAR systems 100 illustrated in FIG. 1 and LIDAR system 10 illustrated in FIG. 2 of the present invention. In one aspect, it is recognized that data processing blocks of method 300 may be carried out via a pre-programmed algorithm executed by one or more processors of controller 132, or any other general purpose computing system. It is recognized herein that the particular structural aspects of LIDAR system 100 do not represent limitations and should be interpreted as illustrative only.

In block 301, a measurement pulse of illumination light is generated by an illumination source mounted to a printed circuit board.

In block 302, a return pulse of light is detected by a detector mounted to the printed circuit board. The return pulse is an amount of the measurement pulse reflected from a location in a three dimensional environment illuminated by the corresponding measurement pulse. The measurement pulse of illumination light and the return pulse share a common optical path over a distance within the integrated LIDAR device.

In block 303, an output signal is generated that is indicative of the detected return pulse.

In block 304, an amount of electrical power is provided to the illumination source by an illumination driver mounted to the printed circuit board. The provided electrical power causes the illumination source to emit the measurement pulse of illumination light.

In block 305, the output signal is amplified by an amount of analog signal conditioning electronics mounted to the printed circuit board.

In block 306, the amplified output signal is converted to a digital signal by an analog to digital converter mounted to the printed circuit board.

In block 307, a time of flight of the measurement pulse from the LIDAR device to the measured location in the three dimensional environment and back to the LIDAR device is determined based on the digital signal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An integrated light detection and ranging (LIDAR) device, comprising:
    an illumination source mounted to a printed circuit board, the illumination source configured to generate a measurement pulse of illumination light;
    a detector mounted to the printed circuit board, the detector configured to detect a return pulse of light and generate an output signal indicative of the detected return pulse, wherein the return pulse is an amount of the measurement pulse reflected from a location in a three dimensional environment illuminated by the corresponding measurement pulse, wherein the measurement pulse of illumination light and the return pulse share a common optical path over a distance within the integrated LIDAR device;
    an illumination driver mounted to the printed circuit board, the illumination driver electrically coupled to the illumination source and configured to provide an amount of electrical power to the illumination source that causes the illumination source to emit the measurement pulse of illumination light, wherein the illumination source and the illumination driver are integrated onto a single Gallium Nitride based substrate that is mounted to the printed circuit board;
    an amplifier mounted to the printed circuit board, the amplifier configured to amplify the output signal generated by the detector;
    an analog to digital converter mounted to the printed circuit board, the analog to digital converter configured to convert the amplified output signal to a digital signal; and
    a computing system configured to:
        receive the digital signal indicative of the detected amount of light; and
        determine a time of flight of the measurement pulse from the LIDAR device to the measured location in the three dimensional environment and back to the LIDAR device based on the digital signal.

2. The LIDAR device of claim 1, wherein the return pulse of light and the illumination pulse are separated from the common optical path by a beam splitter within the LIDAR device.

3. The LIDAR device of claim 2, further comprising:
    a first polarization control element located in a beam path of the measurement pulse of illumination light, wherein in a first state the first polarization control element causes the measurement pulse of illumination light to pass through the first polarization control element, and wherein in a second state the first polarization control element causes the return pulse to be reflected from the first polarization control element toward the detector.

4. The LIDAR device of claim 3, further comprising:
    a second polarization control element located in a beam path of the return pulse, wherein the second polarization control element controls an amount of the return pulse that is directed to the detector.

5. The LIDAR device of claim 1, wherein the detector includes an active sensing surface area and a slot through the active surface area of the detector.

6. The LIDAR device of claim 5, wherein the slot is a void through the detector.

7. The LIDAR device of claim 6, wherein the illumination source emits the measurement pulse of illumination light through the slot in the detector such that the measurement pulse of illumination light is within the field of view of the detector.

8. The LIDAR device of claim 1, further comprising:
    an active optical element having a selectable index of refraction located in the common optical path, wherein the active optical element in a first state directs the return pulse to the detector, and wherein the active optical element in a second state directs the measurement beam of illumination light into the common optical path.

9. The LIDAR device of claim 1, further comprising:
    a first optical element located in the common optical path, the first optical element configured to focus the return pulse of light onto the detector; and
    a second optical element located in the common optical path, the second optical element configured to direct the measurement beam of illumination light into the common optical path, wherein the illumination source is located outside the field of view of the detector.

10. The LIDAR device of claim 1, further comprising:
    a mirror element located in the common optical path, wherein the mirror element includes a transparent aperture within a portion of the mirror that is within the field of view of the detector, and wherein the illumination source emits the measurement beam of illumination light through the transparent aperture into the common optical path.

11. The LIDAR device of claim 1, wherein the illumination source is located in the shared optical path within a field of view of the detector.

12. The LIDAR device of claim 11, wherein the illumination source is embedded in an optical element located in the shared optical path within the field of view of the detector.

13. The LIDAR device of claim 1, further comprising:
a mirror element located in the common optical path within the field of view of the detector; and
an optical fiber element optically coupled between the illumination source located outside a field of view of the detector and the mirror element.

14. A method comprising:
generating a measurement pulse of illumination light by an illumination source mounted to a printed circuit board;
detecting a return pulse of light by a detector mounted to the printed circuit board, wherein the return pulse is an amount of the measurement pulse reflected from a location in a three dimensional environment illuminated by the corresponding measurement pulse, wherein the measurement pulse of illumination light and the return pulse share a common optical path over a distance within the integrated LIDAR device;
generating an output signal indicative of the detected return pulse;
providing an amount of electrical power to the illumination source by an illumination driver mounted to the printed circuit board that causes the illumination source to emit the measurement pulse of illumination light, wherein the illumination source and the illumination driver are integrated onto a single Gallium Nitride based substrate that is mounted to the printed circuit board;
amplifying the output signal by an amplifier mounted to the printed circuit board;
converting the amplified output signal to a digital signal by an analog to digital converter mounted to the printed circuit board; and
determining a time of flight of the measurement pulse from the LIDAR device to the measured location in the three dimensional environment and back to the LIDAR device based on the digital signal.

15. The method of claim 14, wherein the illumination source emits the measurement pulse of illumination light through a slot in an active surface of the detector such that the measurement pulse of illumination light is within the field of view of the detector.

16. The method of claim 14, further comprising:
selecting an index of refraction of an active optical element located in the common optical path, wherein the index of refraction in a first state directs the return pulse to the detector, and wherein the index of refraction in a second state directs the measurement beam of illumination light into the common optical path.

17. The method of claim 14, further comprising:
focusing the return pulse of light onto the detector with a first optical element located in the common optical path; and
directing the measurement beam of illumination light into the common optical path with a second optical element located in the common optical path, wherein the illumination source is located outside the field of view of the detector.

18. The method of claim 14, further comprising:
emitting the measurement beam of illumination light through a transparent aperture within a portion of a mirror element within a field of view of the detector.

19. The method of claim 14, wherein the illumination source is located in the shared optical path within a field of view of the detector.

20. The method of claim 14, further comprising:
optically coupling the illumination source located outside a field of view of the detector and a mirror element located in the common optical path within the field of view of the detector.

21. The method of claim 14, further comprising:
selecting a first polarization state of a first polarization control element located in a beam path of the measurement pulse of illumination light that causes the measurement pulse of illumination light to pass through the first polarization control element; and
selecting a second polarization state of the first polarization control element that causes the return pulse to be reflected from the first polarization control element toward the detector.

22. The method of claim 21, further comprising:
selecting a polarization state of a second polarization control element located in a beam path of the return pulse that controls an amount of the return pulse that is directed to the detector.

23. An integrated light detection and ranging (LIDAR) device, comprising:
an illumination source mounted to a printed circuit board, the illumination source configured to generate a measurement pulse of illumination light;
a detector mounted to the printed circuit board, the detector configured to detect a return pulse of light and generate an output signal indicative of the detected return pulse, wherein the return pulse is an amount of the measurement pulse reflected from a location in a three dimensional environment illuminated by the corresponding measurement pulse, wherein the measurement pulse of illumination light and the return pulse share a common optical path over a distance within the integrated LIDAR device;
an illumination driver mounted to the printed circuit board, the illumination driver electrically coupled to the illumination source and configured to provide an amount of electrical power to the illumination source that causes the illumination source to emit the measurement pulse of illumination light, wherein the illumination source and the illumination driver are integrated onto a single Gallium Nitride based substrate that is mounted to the printed circuit board; and
a computing system configured to determine a time of flight of the measurement pulse from the LIDAR device to the measured location in the three dimensional environment and back to the LIDAR device based at least in part on output signal.

* * * * *